(12) United States Patent
Holz

(10) Patent No.: US 10,697,779 B2
(45) Date of Patent: Jun. 30, 2020

(54) LANDMARK PLACEMENT FOR LOCALIZATION

(71) Applicant: X Development LLC, Mountain View, CA (US)

(72) Inventor: Dirk Holz, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 454 days.

(21) Appl. No.: 15/494,216

(22) Filed: Apr. 21, 2017

(65) Prior Publication Data
US 2018/0306589 A1    Oct. 25, 2018

(51) Int. Cl.
| G01C 21/26 | (2006.01) |
| G01C 21/28 | (2006.01) |
| G01S 5/16 | (2006.01) |
| G05D 1/02 | (2020.01) |
| G01S 17/87 | (2020.01) |
| G01S 7/48 | (2006.01) |
| G05D 1/00 | (2006.01) |
| G01S 17/04 | (2020.01) |
| G01C 21/20 | (2006.01) |

(52) U.S. Cl.
CPC .......... *G01C 21/265* (2013.01); *G01C 21/28* (2013.01); *G01S 5/16* (2013.01); *G01S 5/163* (2013.01); *G01S 7/4808* (2013.01); *G01S 17/04* (2020.01); *G01S 17/87* (2013.01); *G05D 1/0044* (2013.01); *G05D 1/0236* (2013.01); *G05D 1/0274* (2013.01); *G05D 1/0297* (2013.01); *G01C 21/206* (2013.01); *G05D 2201/0216* (2013.01)

(58) Field of Classification Search
CPC .................................................. G01C 21/265;
G01C 21/3644; G01C 21/005; G01S
17/04; G01S 5/163; G01S 17/87; G05D
1/0236
USPC ....................................................... 701/454
See application file for complete search history.

(56) References Cited

U.S. PATENT DOCUMENTS

| 7,020,326 B1 * | 3/2006 | Hsu ..................... G06K 9/00993 382/113 |
| 8,849,036 B2 * | 9/2014 | Shin ..................... G05D 1/0246 382/190 |
| 2006/0095170 A1 * | 5/2006 | Yang .................... G05D 1/0246 701/23 |
| 2009/0060292 A1 * | 3/2009 | Sukegawa .............. H04N 5/147 382/118 |

(Continued)

*Primary Examiner* — Isaac G Smith
(74) *Attorney, Agent, or Firm* — McDonell Boehnen Hulbert & Berghoff LLP

(57) ABSTRACT

Embodiments are provided that include receiving sensor data from a sensor positioned at a plurality of positions in an environment. The environment includes a plurality of landmarks. The embodiments also include determining, based on the sensor data, a subset of the plurality of landmarks detected at each of the plurality of positions. The embodiments further include determining, based on the subset of the plurality of landmarks detected at each of the plurality of positions, a detection frequency of each landmark. The embodiments additionally include determining, based on the determined detection frequency of each landmark, a localization viability metric associated with each landmark. The embodiments still further include providing for display, via a user interface, a map of the environment. The map includes an indication of the localization viability metric associated with each landmark.

16 Claims, 21 Drawing Sheets

(56) References Cited

U.S. PATENT DOCUMENTS

2017/0225321 A1\* 8/2017 Deyle .................. G05D 1/0044

\* cited by examiner

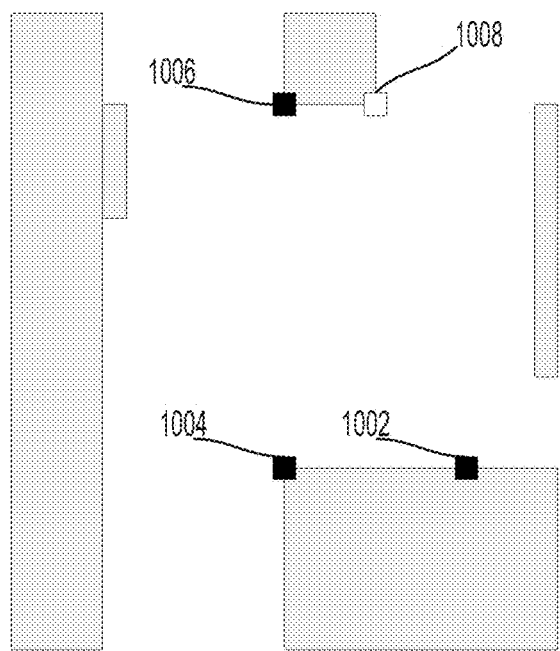
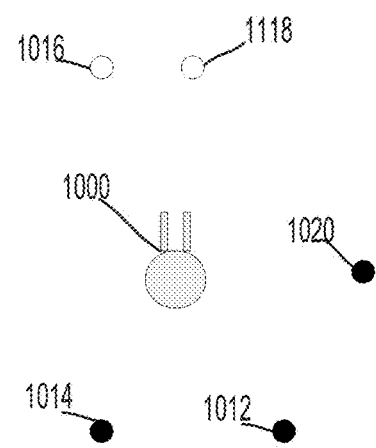
FIG. 10A  FIG. 10B
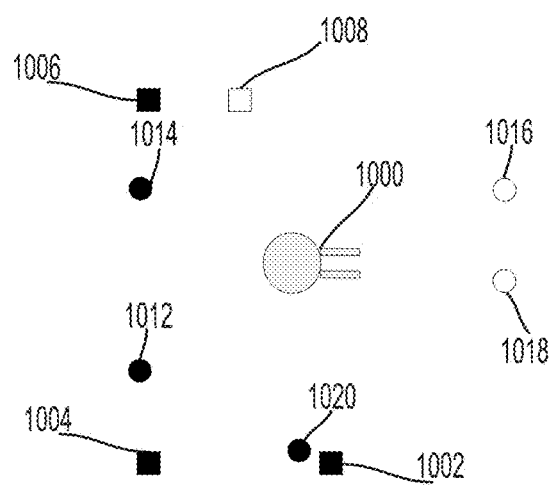
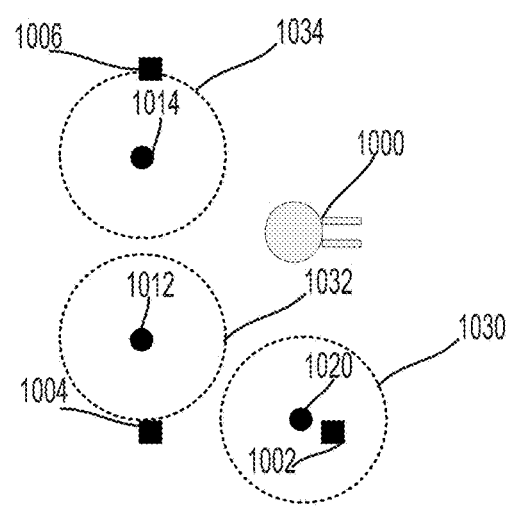
FIG. 10C  FIG. 10D

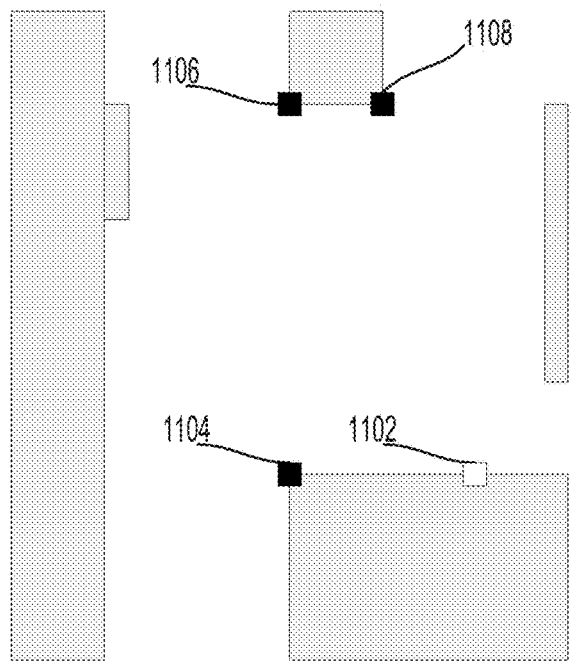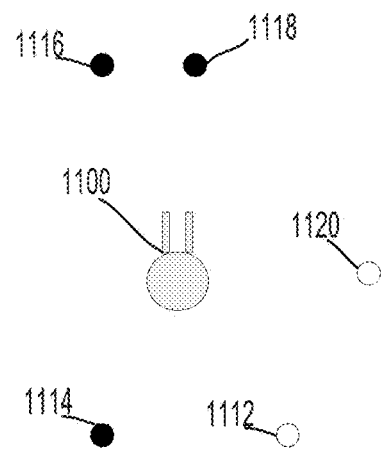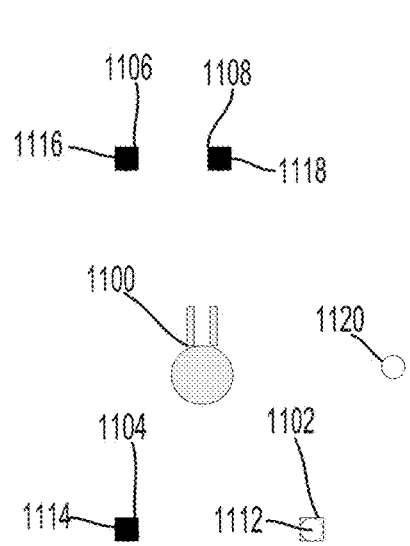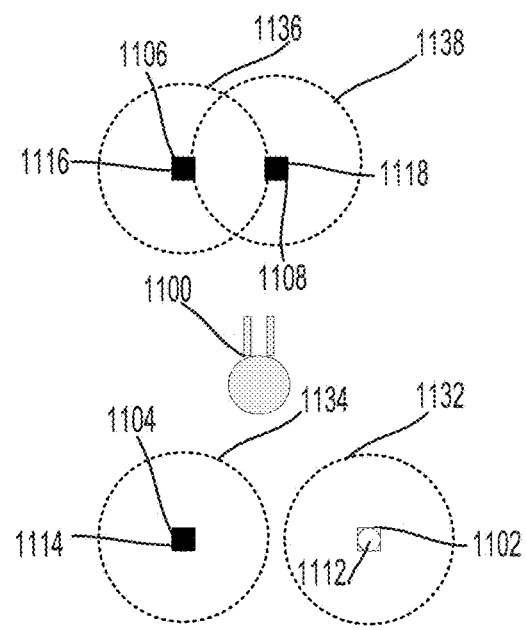
FIG. 11A
FIG. 11B
FIG. 11C
FIG. 11D

LANDMARK PLACEMENT FOR LOCALIZATION

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storage of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices ("robots") guided by computer control systems. The computer control systems may localize the one or more robots in relation to markers distributed throughout the warehouse. Localizing the robots may allow the computer control systems to navigate the one or more robots through the warehouse.

SUMMARY

Example systems and methods may help to evaluate an environment for purposes of accurately and consistently localizing vehicles and/or sensors within the environment. The environment may include landmarks. Mapping the locations of the landmarks within the environment may allow for localizing the vehicles and/or sensors within the environment. A sensor may detect the landmarks, and the sensor, or a processor external to the sensor may associate the detected landmarks with those on the map, and thereby estimate a pose of the sensor within the environment. However, certain characteristics of the landmarks may inhibit localization of the sensor. For instance, one or more of the landmarks may be placed in locations where they are infrequently detected. Thus, the map of the environment may include indications of how viable the landmarks are for localizing the sensor. Such indications may be based, at least in part, on how frequently the landmarks are detected.

In one example, a method is provided that includes receiving sensor data from a sensor positioned at a plurality of positions in an environment. The environment includes a plurality of landmarks. The method also includes determining, based on the sensor data, a subset of the plurality of landmarks detected at each of the plurality of positions. The method further includes determining, based on the subset of the plurality of landmarks detected at each of the plurality of positions, a detection frequency of each landmark. The method additionally includes determining, based on the determined detection frequency of each landmark, a localization viability metric associated with each landmark. The method still further includes providing for display, via a user interface, a map of the environment. The map includes an indication of the localization viability metric associated with each landmark.

In another example, a system is provided that includes a sensor, one or more processors, and a non-transitory computer-readable medium. The system also includes program instructions stored on the non-transitory computer readable medium and executable by the one or more processors to receive sensor data from the sensor at a plurality of positions in an environment. The environment comprises a plurality of landmarks. The program instructions also determine, based on the sensor data, a subset of the plurality of landmarks detected at each of the plurality of positions. The program instructions further determine, based on the subset of the plurality of landmarks detected at each of the plurality of positions, a detection frequency of each landmark. The program instructions additionally determine, based on the determined detection frequency of each landmark, a localization viability metric associated with each landmark. The program instructions still further provide for display, via a user interface, a map of the environment. The map includes an indication of the localization viability metric associated with each landmark.

In another example, a non-transitory computer readable medium is provided having stored therein instructions executable by one or more processors to cause a computing system to perform functions. The functions include receiving sensor data from a sensor positioned at a plurality of positions in an environment. The environment includes a plurality of landmarks. The functions also include determining, based on the sensor data, a subset of the plurality of landmarks detected at each of the plurality of positions. The functions further include determining, based on the subset of the plurality of landmarks detected at each of the plurality of positions, a detection frequency of each landmark. The functions additionally include determining, based on the determined detection frequency of each landmark, a localization viability metric associated with each landmark. The functions still further include providing for display, via a user interface, a map of the environment. The map includes an indication of the localization viability metric associated with each landmark.

In another example, a system is provided that includes means for receiving sensor data from a sensor positioned at a plurality of positions in an environment. The environment includes a plurality of landmarks. The system also includes means for determining, based on the sensor data, a subset of the plurality of landmarks detected at each of the plurality of positions. The system further includes means for determining, based on the subset of the plurality of landmarks detected at each of the plurality of positions, a detection frequency of each landmark. The system additionally includes means for determining, based on the determined detection frequency of each landmark, a localization viability metric associated with each landmark. The system still further includes means for providing for display, via a user interface, a map of the environment. The map includes an indication of the localization viability metric associated with each landmark.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIGS. 10A, 10B, 10C, and 10D illustrate determination of inliers associated with a sample set of candidate landmarks and corresponding mapped landmarks, in accordance with an example embodiment.

FIGS. 11A, 11B, 11C, and 11D illustrate determination of inliers associated with another sample set of candidate landmarks and corresponding mapped landmarks, in accordance with an example embodiment.

DETAILED DESCRIPTION

Figure 1:
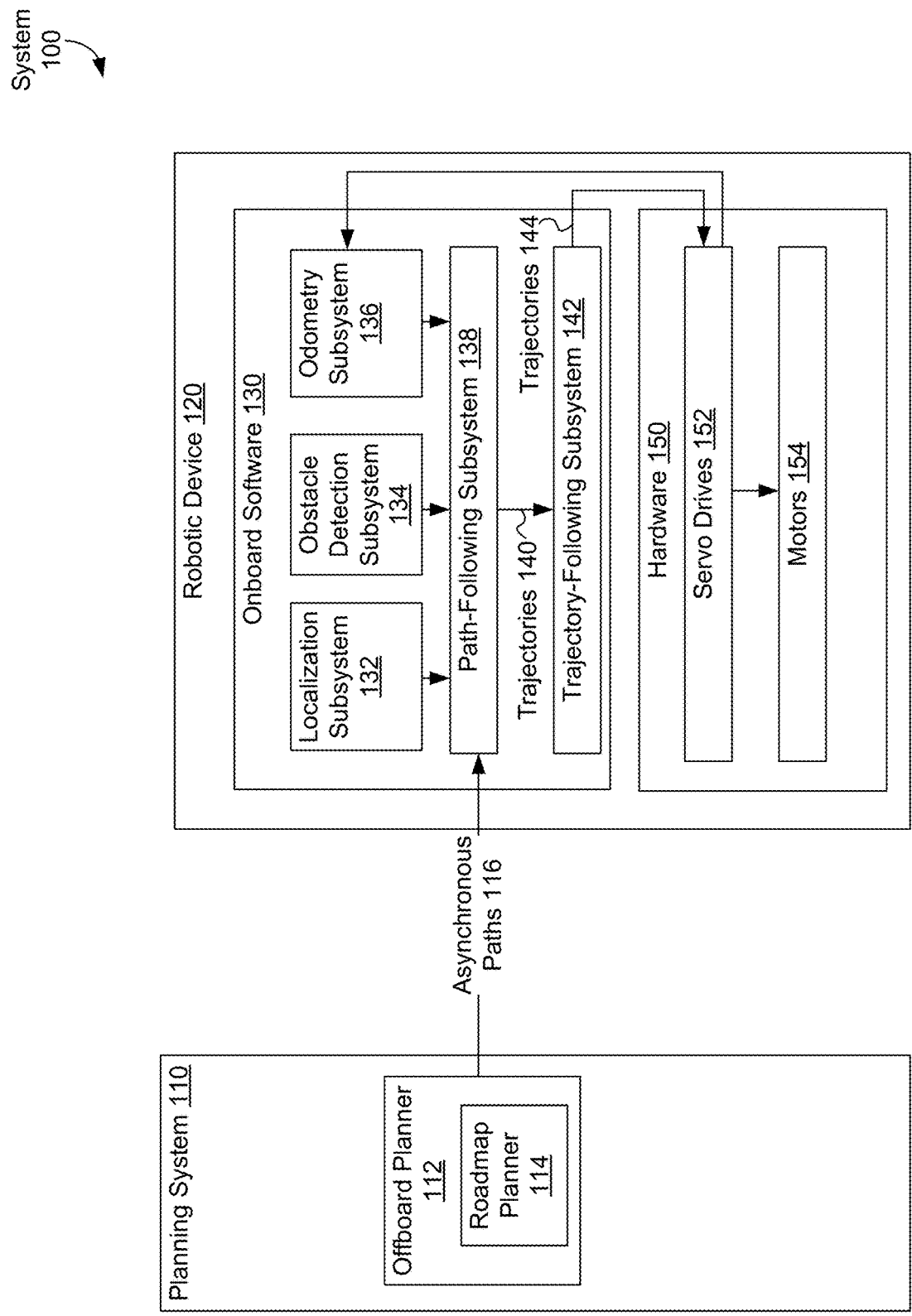
FIG. 1 is a block diagram of a system, in accordance with an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

Example embodiments may include or otherwise relate to methods and systems that may be used to assist in localizing vehicles and/or sensors within an environment and to thereby assist in navigating vehicles through the environment. For example, a sensor may detect landmarks placed within the environment. The sensor may be coupled to a robotic vehicle or a manually-operated vehicle, or the sensor may be a standalone device. The landmarks may be mapped, such that detected landmarks by the sensor may be associated with those on the map to infer the pose of the sensor within the environment.

In some scenarios, the landmarks placed within the environment may not be of particular use for localizing a vehicle or sensor. For example, certain of the landmarks may be positioned such that the sensor does not frequently detect them. In other examples, too few landmarks may be placed in a portion of the environment, such that the pose of the sensor cannot be reliably determined while the robot navigates through that portion of the environment. In still other examples, certain groups of landmarks may be arranged similarly, such that two or more poses of the sensor may be equally likely based on the detected landmarks.

In other examples, the landmarks may not be positioned efficiently. For instance, more landmarks than necessary to estimate the pose of the sensor may be placed in a particular portion of the environment.

Such ineffective or inefficient localization may be difficult to fix once vehicles have been deployed within the environment and have begun to perform tasks. This may be because, for example, operations performed by the vehicles need to cease while the landmarks are moved. Further, simply adjusting the positions of landmarks may not resolve the issues described above. Accordingly, the positions of landmarks may be moved several times until the vehicles can be viably localized at each point within the environment. The systems and methods described herein may allow for informed adjustments to the environment that may allow vehicles within the environment to resume performing tasks quickly.

In some examples, deploying vehicles within the environment may pose similar problems to those arising after the vehicles are deployed. It may be difficult to predict positions of landmarks that will allow for viable localization of the vehicles. As such, the systems and methods may be used to allow for quick deployment of the vehicles into the environment.

To these ends, a map may be provided for display that includes indications of a localization viability metric associated with each landmark within the environment. The indications may be based on how frequently each landmarks is detected as one or more sensors are moved through the space. For example, a region may be defined for each landmark. A number of positions at which sensor data was obtained within the region may be determined. A number of times that the landmark was detected at such positions may be determined. A detection frequency may be based on a ratio of the number of times the landmark was detected to the total number of times sensor data was obtained within the region.

The localization viability metric may be additionally based on how many landmarks are detected at the positions within the environment at which sensor data was obtained. A subset of the plurality of landmarks may be detected at each such position. At some positions, the number of detected landmarks may be too few to confidently localize the robotic vehicle within the environment. The localization viability metric for a given landmark may be based on the numbers of landmarks detected in subsets that contain the given landmark.

The localization viability metrics for each landmark may be further based on geometries formed by the landmarks. Where certain landmarks form two or more similar geometries, the location of a vehicle or sensor may be uncertain when the landmarks of one such geometry are detected. As such, the map may further provide indications of similar geometries of landmarks within the environment.

Such indications of the localization viability metrics associated with each landmark may allow inference of changes to the environment that will allow for accurate and consistent localization of vehicles and/or sensors. However, based on the localization viability metrics, the map may also provide suggested changes to the number or locations of landmarks within the environment. Such suggested changes, when carried out, may allow for more effective localization of vehicles and/or sensors within the environment.

Providing indications of localization viability metrics may allow for simultaneous mapping and evaluation of an environment. A sensor may be moved through the environment having landmarks placed therein. The sensor may provide sensor data used to map the environment. The sensor data may also be used to determine localization viability metrics associated with detected landmarks. Indications of the localization viability metrics may also be provided as the sensor is moved through the environment, so that changes in landmark numbers or placement can be made as the environment is mapped. Such simultaneous mapping and evaluation of the environment may allow for the environment to be confirmed as viable for localization or adjusted to improve localization viability without iteratively performing landmark placement, mapping, and environment evaluation.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, and components, and circuits have not been described in detail so as not to unnecessarily obscure aspects of the embodiments.

II. System Design for Robotic Devices

FIG. 1 is a block diagram of system 100, in accordance with an example embodiment. System 100 includes planning system 110 and robotic device 120. Planning system 110 can include offboard planner 112 that can coordinate motion of one or more robotic devices operating in an environment. Offboard planner 112 can include roadmap planner 114. Offboard planner 112 and/or roadmap planner 114 can generate one or more asynchronous paths 116 for a robotic device, such as robotic device 120, to follow while operating in an environment.

A roadmap graph, prototype graph, or other roadmap representing an environment, such as prototype graph 300 discussed below in the context of FIG. 3, can be received, determined, or otherwise provided to planning system 110, offboard planner 112 and/or roadmap planner 114. Asynchronous paths 116 can be one or more paths based on the roadmap graph, prototype graph, or other roadmap. For example, if the roadmap graph, prototype graph, or other roadmap has a plurality of edges that connect a plurality of intersections, asynchronous paths 116 can be specified in terms of the plurality of edges and/or the plurality of intersections.

In some examples, robotic device 120 can be any one or more steered vehicle(s) capable of following a path. For example, robotic device 120 can include onboard software 130 and/or hardware 150. Onboard software 130 can include one or more of: localization subsystem 132, obstacle detection subsystem 134, odometry subsystem 136, path-following subsystem 138, and trajectory-following subsystem 142. Localization subsystem 132 can be used to localize a robotic device, that is, determine a location of the robotic device within an environment. Localization subsystem 132 can generate position estimates of the robotic device and/or other objects that can be used to localize the robotic device, assist the robotic device in following a path, such as asynchronous paths 116, and/or assist the robotic device in following a trajectory, such as trajectories 140. Once the position estimates are generated, localization subsystem 132 can provide the position estimates to path-following subsystem 138.

An asynchronous path, or path for short, can be a time-invariant plan or other information indicating how robotic device 120 can travel from a starting point SP to an ending point EP; i.e., an (asynchronous) path does not take time into account. In contrast, a trajectory can include values of a steering angle and of traction motor velocity that robotic device 120 can follow for a planning time interval.

The planning time interval can be a duration of time during which a robotic device is guided, or planned, to follow a path, route, and/or travel. In some embodiments, the planning time interval can be a predetermined amount of time; e.g., five seconds, one second, 0.2 seconds, 0.1 seconds. In particular, a predetermined planning time interval can be determined based on a user input that specifies a value for the planning time interval. In other embodiments, the planning time interval can be determined based on one or more other values; e.g., a stitch time, a time associated with a uniform edge (or path) cost, an estimated time to travel along a trajectory. Other techniques for determining the planning time interval and values for the planning time interval are possible as well.

Then, one or more trajectories can be used to describe how robotic device 120 can travel from starting point SP to an ending point EP in a time-variant manner. In some embodiments, a trajectory can also provide information about values of other variables than a steering angle and a traction motor velocity over the planning time interval, such as, but not limited to, other kinematic variables (e.g., velocity and acceleration) of robotic device 120, and actuator positions of robotic device 120.

As an example, a path to drive a car from a location "home" to a location "work" may include an ordered listing of streets that a control entity, such as a person or control device of an autonomous vehicle, can use to drive the car from home to work. In this example, a trajectory from home to work can involve one or more instructions specifying velocity and/or acceleration that the control entity can use to drive the car from home to work. In some examples, the trajectory can take traffic, obstacles, weather, and other time-sensitive conditions into account; e.g., the trajectory to go from home to work can indicate that the control entity "turn right for 10 seconds at 20 MPH or less", "accelerate to 55 MPH and drive straight for 3 minutes", "slow to 20 MPH within 30 seconds", "turn left for 10 seconds at 20 MPH or less", etc. In some embodiments, the trajectory can be changed along the way; e.g., to account for obstacles, changes in path, etc.

Obstacle detection subsystem 134 can determine whether one or more obstacles are blocking a path and/or a trajectory of robotic device 120. Examples of these obstacles can include, but are not limited to, pallets, objects that may have fallen off a pallet, robotic devices, and human operators working in the environment. If an obstacle is detected, obstacle detection subsystem 134 can provide one or more communications indicating obstacle detection to path-following subsystem 138. The one or more communications indicating obstacle detection can include location information about one or more positions of one or more obstacles detected by obstacle detection subsystem 134 and/or identification information about the one or more obstacles detected by obstacle detection subsystem 134. Odometry subsystem 136 can use data, such as data from servo drives 152, to estimate one or more changes in position of robotic device 120 over time.

Path-following subsystem 138 and/or trajectory-following subsystem 142 can act as a planner aboard robotic device 120. This onboard planner can follow one or more paths, such as asynchronous paths 116, based on position estimates provided by localization subsystem 132.

Path-following subsystem 138 can receive asynchronous paths 116, position estimate inputs from localization subsystem 132, location information about one or more positions of one or more obstacles from obstacle detection subsystem 134, and/or information about one or more changes in position from odometry subsystem 136, and generate one or more trajectories 140 as outputs.

Hardware 150 can include servo drives 152 and/or motors 154. Servo drives 152 can include one or more servomechanisms and related electrical equipment. In some examples, servo drives 152 can include one or more electronic amplifiers used to power the one or more servomechanisms and/or to monitor feedback signals from the servomechanism(s). Servo drives 152 can receive control signals, such as trajectories 144, from onboard software 130, and can provide electric current to the servomechanism(s) to produce motion proportional to the control signals. In some embodiments, servo drives 152 can compare status information received from the servomechanism(s) with an expected status as commanded by trajectories 144. Then, servo drives 152 can adjust a voltage frequency or pulse width of the provided electric current to correct for deviations between received status information and an expected status. In other embodiments, servo drives 152 can provide information, such as the feedback signals and/or location-related information, to onboard software 130.

One or more motors 154 can be part or all of the servomechanism(s) of servo drives 152. For example, motors 154 can use the electric current provided by servo drives 152 to generate mechanical force to drive part or all of robotic device 120; e.g., motors 154 can provide force to propel robotic device 120 and/or drive one or more effectors of robotic device 120.

Path planning of robotic devices within an environment, such as an environment that includes indoor settings, such as a warehouse, office building, or home, and/or outdoor settings, such as a park, parking lot, or yard, can be performed with respect to a roadmap graph, which is a connected graph of paths that agents, such as robotic devices, may follow. Using roadmap graphs to plan agent routing within the environment rather than taking a free-space approach can reduce a total planning state space and so making large-scale multi agent coordination tractable. Further, the use of roadmap graphs can enable operators to intuitively control areas in which robotic devices are allowed to navigate.

Roadmap graph generation can first involve generation of a prototype graph, which indicates the rough position of lanes and directions of travel. In some examples, a prototype graph can be a directed graph that indicates lanes and directions of travel of robotic devices. In other examples, a prototype graph can be generated manually based on a map or drawing of the environment.

Figure 2:
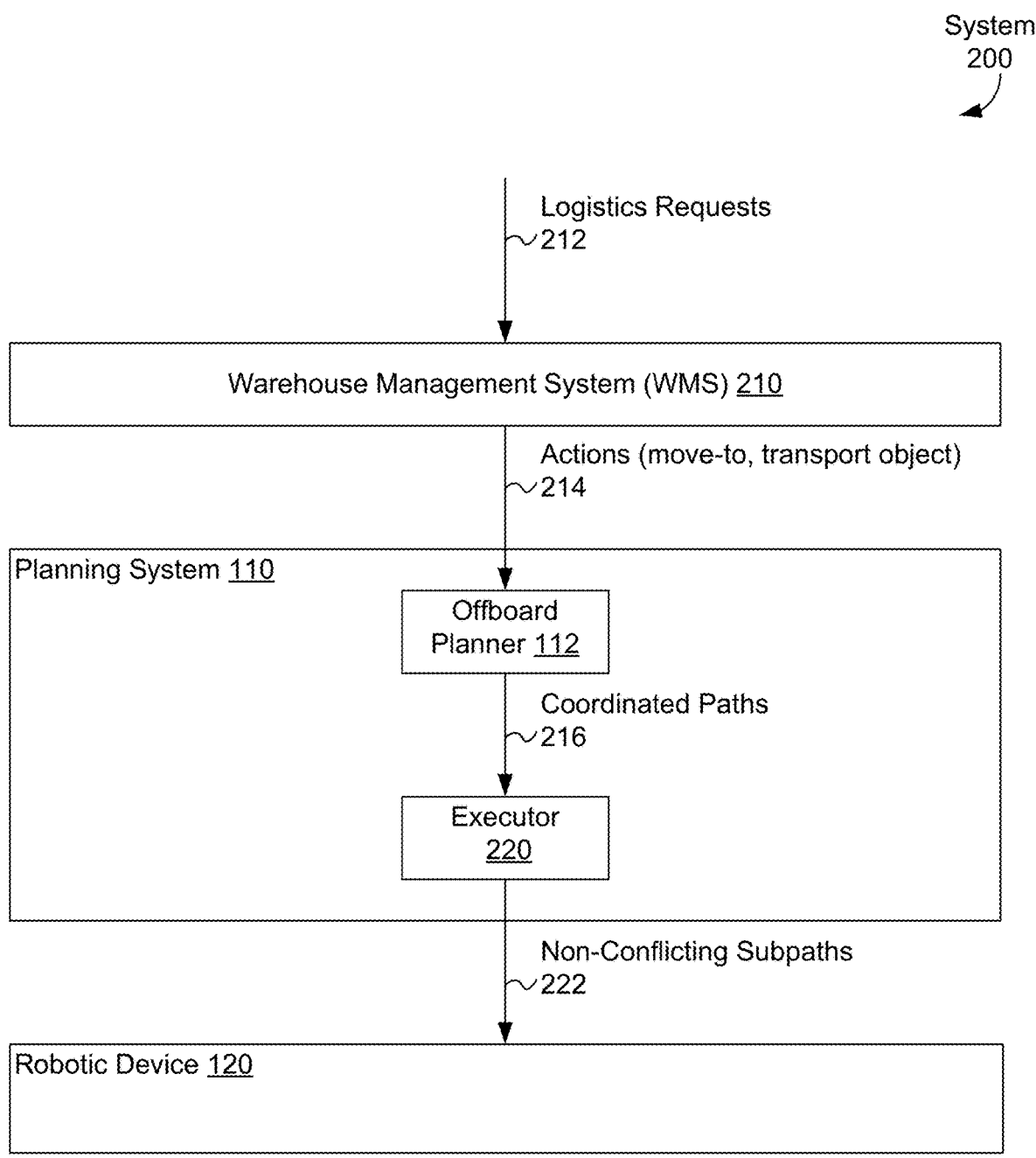
FIG. 2 depicts a system for operating one or more warehouses, in accordance with an example embodiment.

FIG. 2 depicts system 200 for operating one or more warehouses, in accordance with an example embodiment. System 200 includes warehouse management system 210, planning system 110, and robotic device 220. Warehouse management system 210 can receive one or more logistics requests 212 associated with the warehouse; e.g., requests to store one or more items in the warehouse and/or requests to ship one or more items from the warehouse. Warehouse management system 210 can translate logistics requests 212 into one or more actions 214, where actions 214 can include, but are not limited to, a "move-to" action to move one or more designated agents to one or more designated locations, and a "transport" action to carry one or more items to one or more designated locations. In some examples, actions 214 can include go-to commands of the form {agent ID, destination}, but other actions are possible such as "move pallet". These are typically decomposable into move-to commands, however (move to pick location, move to place location).

Planning system 110 includes offboard planner 112 and executor 220. Offboard planner 112 can receive actions 214 as inputs and generate one or more coordinated paths 216 for one or more agents operating in a warehouse; e.g., multiple robotic devices, to carry out actions 214. Coordinated paths 216 can be part of a coordinated action plan for all agents in the warehouse to fulfill logistics requests 212. The coordinated action plan can take precedence of agents into account; e.g., if robotic devices RD1 and RD2 are both expected to reach a point at approximately the same time, one of the robotic devices can have precedence or priority over the other, such as robotic device RD1 waiting for robotic device RD2 to pass through the point (or vice versa). Executor 220 can receive coordinated paths 216 and generate non-conflicting sub-paths 222 to direct robotic device 120 in accomplishing its part of the coordinated action plan to carry out actions 214 to fulfill logistics requests 212.

As illustrated above in FIG. 2, planning system 110, which includes offboard planner 112 and executor 220, can communicate with robotic device 120. In some embodiments, the robotic device can be a fork truck; for example, any Occupational Safety and Health Administration (OSHA) Class 1 or Class 3 powered industrial truck. In other embodiments, planning system 110 can includes software that executes using one or more networked computing devices located in the "cloud" (e.g., one or more networked computing devices) and/or located somewhere on a premises co-located with robotic device 120.

In some embodiments, offboard planner 112 and executor 220 can be synchronized. In an example embodiment, offboard planner 112 and executor 220 can be implemented on one device; e.g., in planning system 110 or robotic device 120, and synchronized within the device. In another example embodiment, offboard planner 112 and executor 220 can act synchronously in one or more devices.

Figure 3:
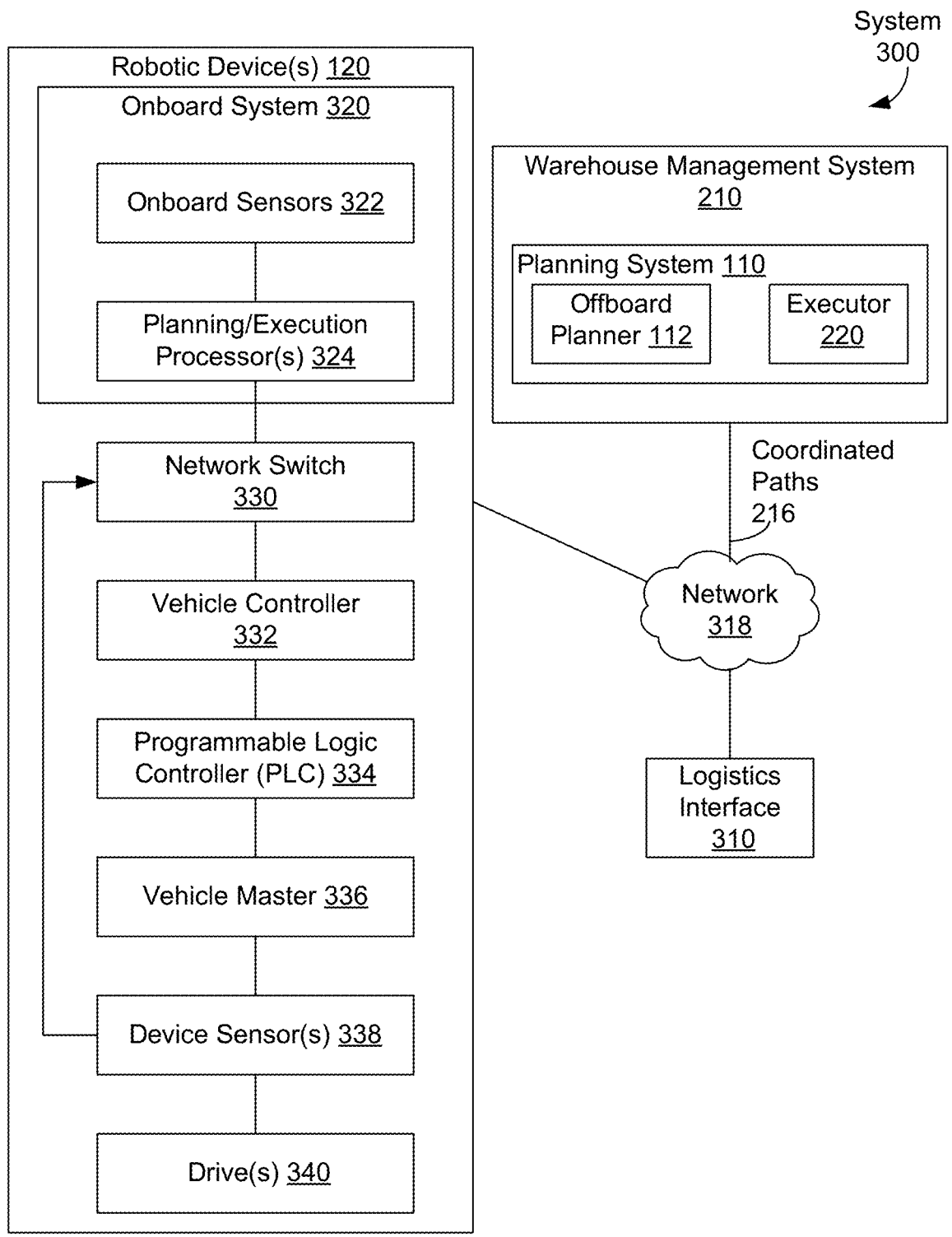
FIG. 3 illustrates a system, in accordance with an example embodiment.

FIG. 3 illustrates a system 300 that includes logistics interface 310, warehouse management system 210, and one or more robotic devices 120 connected using network 318, in accordance with an example embodiment. Logistics interface 310 can provide inventory task instructions to warehouse management system 210 via network 318 regarding movement of objects, such as pallets, and/or robotic devices to warehouse management system 210. An example inventory task can be to move pallet A containing items of type B to location C.

Warehouse management system 210 can receive the inventory task instructions from logistics interface 310 and generate one or more task/mission instructions (e.g., an instruction to robotic device A to move pallet B from location C to location D) and/or plans for controlling robotic device(s) 120 to carry out the inventory task instructions. The task/mission instructions and/or plans can include information about one or more paths and/or one or more trajectories, where the task/mission instruction(s), plan(s), path(s) and trajectory/trajectories are generated by planning system 110 of warehouse management system 210 using the techniques discussed in the context of FIGS. 1 and 2.

For example, warehouse management system 210 can be a centralized control service running on and storing data using one or more computing devices; e.g., server computing devices. To perform these tasks, warehouse management system 210 can include WMS middleware and can provide a user interface to provide access to tools for monitoring and managing system 300. The WMS middleware and/or other components of warehouse management system 210 can use one or more application programming interfaces (APIs), such as protocol conversion APIs for conversion between task/mission instructions (e.g., an instruction to robotic device A to move pallet B from location C to location D) to robotic device paths, poses, and/or trajectories; conversion between inventory tasks and task/mission instructions; and conversions between APIs.

The user interface provided by warehouse management system 210 can provide one or more user interface functions for system 300, including, but not limited to: monitoring of robotic device(s) 120, e.g, presenting data related to location, battery status, state of charge, etc. of one or more robotic devices; enabling generation and sending of inventory task instruction(s), task/mission instruction(s), plan(s), path(s) and/or trajectory/trajectories to one or more of robotic device(s) 120; and reviewing, updating, deletion, and/or insertion of data related to one or more warehouse maps, pallets, networks, and/or planning systems (e.g., planning system 110, warehouse management system 210, and/or logistics interface 310).

In some embodiments, warehouse management system 210 can route communications between logistics interface 310 and robotic device(s) 120 and between two or more of robotic device(s) 120 and manage one or more onboard systems, such as onboard system 320 aboard one or more of robotic device(s) 120. In other embodiments, warehouse management system 210 can store, generate, read, write, update, and/or delete data related to system 300, such as, but not limited to: data regarding completion of a task/mission instruction by one or more of robotic device(s) 120; data regarding locations and/or poses of some or all of robotic device(s) 120, including data indicating a location where a robotic device was initialized/booted; data related to one or more audit trails for human actions, incident analysis, and/or debugging; and data for state tracking. In other embodiments, warehouse management system 210 can include a central message router/persistence manager that communicates with robotic device(s) 120 and one or more adapters. Each of the one or more adapters can provide access to data and/or communications of system 300 available to warehouse management system 210, and can include, but are not limited, to: a user interface service adapter for the above-mentioned user interface, a web content service adapter enabling World Wide Web (WWW)/Internet access to information about system 300, a message proxy adapter and/or a WMS adapter to act as intermediaries between communications between APIs and/or the WMS.

FIG. 3 shows that each of the one or more robotic devices 120 can include one or more of: onboard system 320, network switch 330, vehicle controller 332, programmable logic controller (PLC) 334, one or more device sensors 338, and one or more drives 340.

Onboard system 320 can be a computation and sensor package for robotic planning configured for installation into and use with robotic device 120, where onboard system 320 can include onboard sensors 322 and one or more planning/execution processors 324. FIG. 3 also shows that onboard system 320 that is configured to use network switch 330 at least to communicate with planning system 110 (via network 318), with device sensors 338, and/or with one or more actuators of robotic device 120.

Onboard system 320 can be responsible for one or more of: localization of robotic device 120, generation of local trajectories to carry out plans and/or travel along paths and/or trajectories provided by warehouse management system 210, generation of commands to drives 340 to follow one or more (local) trajectories, generation of commands to control actuator(s) of robotic device 120, and reporting pose, status and/or other information to warehouse management system 210.

Onboard sensors 322 can include one or more navigation lasers, laser scanners, cameras, and/or other sensors for navigating and/or controlling onboard system 320. For example, a robotic device of robotic device(s) 120 can include one or more laser scanners, such as one or more laser scanners provided by SICK AG of Waldkirch, Germany, HOKUYO AUTOMATIC CO. LTD of Osaka, Japan, and/or KEYENCE CORPORATION of Osaka, Japan. The laser scanners can be used for obstacle detection and/or avoidance along a direction of travel of the robotic device as well as along the sides, corners, and/or back of the robotic device. The laser scanners can also be used to localize the robotic device using reflector-based localization. In some embodiments, cameras and/or other sensors can be used for obstacle detection, obstacle avoidance, and/or localization instead of or along with the laser scanners.

Planning/execution processor(s) 324 can include one or more computer processors connected at least to onboard sensors 322. Planning/execution processor(s) 324 can read data from onboard sensors 322, generate local trajectories and/or commands to drive(s) 340 to move robotic device 120, and communicate with warehouse management system 210. A local trajectory can be a trajectory where robotic device 120 starts at a starting pose and reaches an ending pose at some time. In some examples, the starting pose can be implicitly specified; e.g., the starting pose can be a current pose of robotic device 120 and so the local trajectory be based on an assumption that its starting pose is the current pose of robotic device 120.

Planning/execution processor(s) 324 can utilize a component framework. The component framework can be a multi-threaded job scheduling and message passing system built on software libraries for input/output (I/O) and signaling configured to provide a consistent asynchronous model of robotic device 120, such as the "boost::asio" and "boost::signals2" software libraries provided by boost.org of Onancock, Va. The component framework can enable communication between software components (or modules) so that the software components can be executed in parallel in a thread safe manner.

The component framework can include one or more of: a state machine component, a localization component, a planning component, and a trajectory following component. The state machine component can manage a state of robotic device 120 for vehicle initialization, vehicle commanding and fault handling. The state machine component can use a deterministic finite automaton or other state machine to manage the state of the robotic device.

The localization component can read data from vehicle sensors and integrate prior state information of robotic device 120 to determine a pose of robotic device 120. The vehicle sensor data may be indicative of one or more landmarks/points of interest detected by the vehicle sensors. Alternatively, the data from the vehicle sensors may require processing such that the localization component detects the one or more landmarks/points of interest based on the vehicle sensor data. The pose can be determined relative to the one or more detected landmarks/points of interest, such as pallets or other objects. The planning component can receive one or more objectives from warehouse management system 210 and determine a local trajectory for robotic device 120 to achieve those objectives. In some embodiments, the local trajectory can be a short-term trajectory that robotic device 120 is to follow for a predetermined amount of time; e.g., 100 milliseconds, 200 milliseconds, 500 milliseconds, 1 second, 5 seconds. The trajectory following component can receive the local trajectory generated by the planning component, and generate drive control instructions to travel along the local trajectory. The drive control instructions are then relayed to drives 340 that control a traction motor and other actuators for robotic device 120.

Network switch 330 can enable communications for robotic device(s) 120. These communications can include, but are not limited to, communications between onboard system 320 and the rest of robotic device 120; e.g, device sensors 338 and drives 340, and communications with warehouse management system 210 via network 318. For example, network switch 330 can enable Transmission Control Protocol/Internet Protocol (TCP/IP)-based communications over Ethernet and/or other wireline communications interface(s) to a wireline network and/or over Wi-Fi™ and/or other wireless communications interface(s) to a wireless network, such as a PLANET Ethernet Switch by PLANET Technology Corporation of New Taipei City, Taiwan.

In some embodiments, communications between robotic device(s) 120 and planning system 110 can include remote procedure calls (RPCs). The remote procedure calls can allow invocation of software procedures, methods, and/or functions resident on one or more of robotic device(s) 120 by software of planning system 110 and vice versa. The remote procedure calls can be based on a communications protocol, such as TCP/IP, a HyperText Transfer Protocol (HTTP) such as HTTP 1.0 and/or HTTP 2.0, and/or another communications protocol. Some or all of the remote procedure calls can include encrypted data; such data may be encrypted using the Secure Sockets Layer (SSL), Transport Layer Security (TLS), and/or one or more other encryption algorithms and/or protocols. In embodiments where encrypted data is used, one or more certification authorities, such as a private certification authority, can authenticate one or more certificates used in encrypting and/or decrypting the encrypted data. A certificate authority can use an access control list (ACL) to control access to the one or more certificates. The remote procedure calls can use a request/response protocol and/or a bidirectional streaming protocol for RPC-related communications. In embodiments where the bidirectional streaming protocol is used for RPC-related communications, a single long-lived RPC can be used to implement the bidirectional streaming protocol.

Vehicle controller 332 and/or programmable logic controller 334 can provide electrical and sensor management functionality for robotic device(s) 120. The electrical and sensor management functionality can include, but is not limited to, functionality for electrical load control, lighting control, sensor control, sensor and/or switch signal processing, and power management. Vehicle master 336 can provide functionality for controlling one or more actuators, such as lift devices, of robotic device(s) 320.

Device sensor(s) 338 can include one or more sensors that can provide data related to controlling and/or operating robotic device(s) 120. The data can provide information about an environment about robotic device(s) 120, such as but not limited to, localization information, position estimates, and mapping data. For example, device sensor(s) 338 can include one or more lasers (e.g., two-dimensional (2D) lasers, safety lasers, laser scanners), cameras (e.g., Time-of-Flight (ToF) cameras, Red-Green-Blue (RGB) cameras, thermal cameras), electrical sensors, proximity sensors, navigational devices, and location sensors.

Drive(s) 340 can include one or more drive controllers and/or actuators that provide functionality for moving robotic device(s) 120. The drive controllers can direct the drive actuators to control movement of robotic device(s) 120. The drive actuators can include one or more traction motors, electric drives, hydraulic drives, and pneumatic drives.

Figure 4:
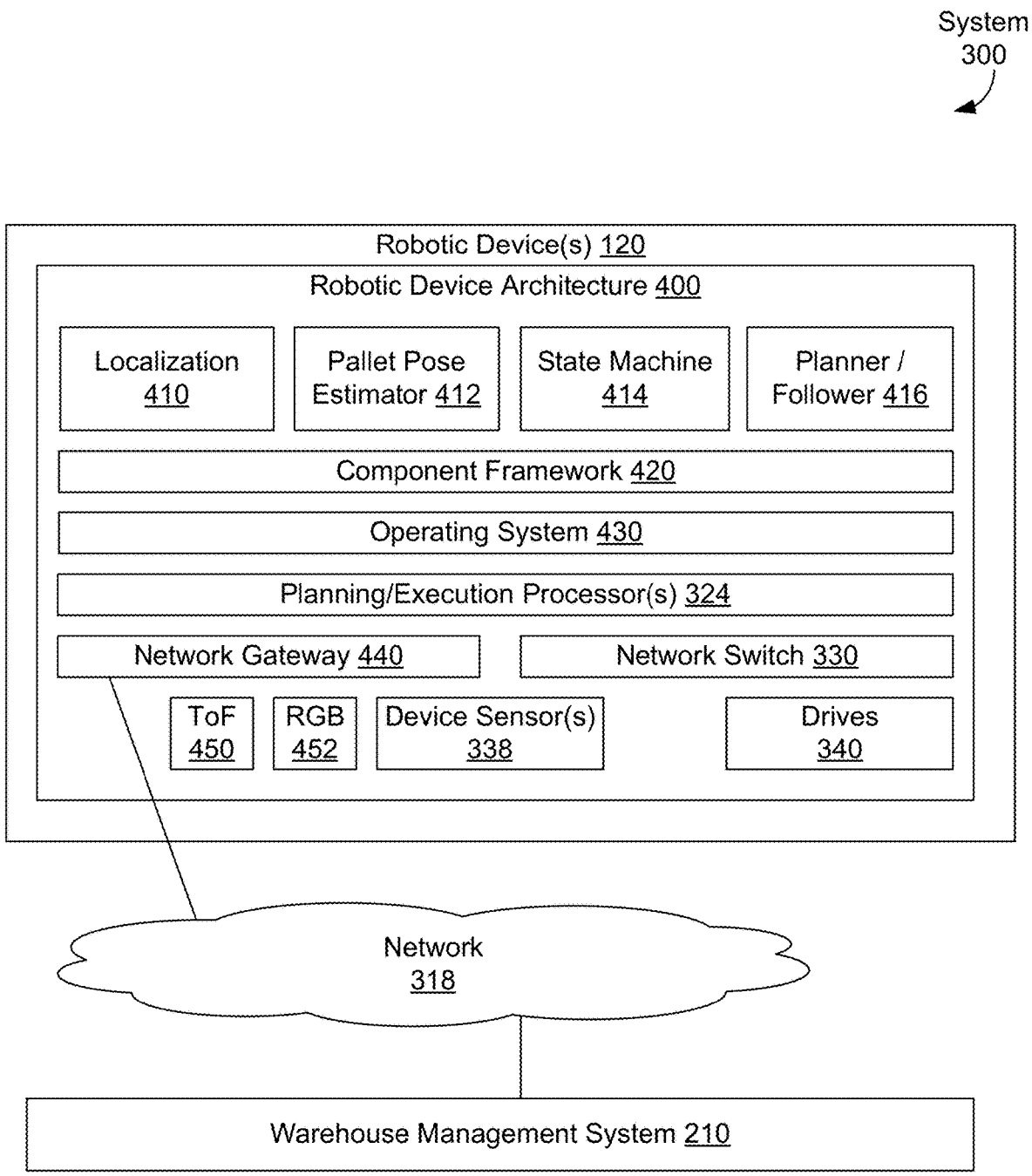
FIG. 4 illustrates a robotic device architecture for one or more robotic devices, in accordance with an example embodiment.

FIG. 4 illustrates robotic device architecture 400 of robotic device(s) 120, in accordance with an example embodiment. Robotic device architecture 400 of robotic device(s) 120 can include software. The software can include software for localization 410, software for a pallet pose estimator 412, software related to state machine 414, software for planner follower 416, software for component framework 420 and software for operating system 430. The software can be executed by one or more hardware planning/execution processors 324. Communications between robotic device(s) 120 and other devices can be carried out using network gateway 440 and/or network switch 330. For example, network gateway 440 can be used for wireless communications with and within a robotic device of robotic device(s) 120 and network switch 330 can be used for wireline communications with and within a robotic device of robotic device(s) 120. Robotic device architecture 400 also includes additional hardware such as device sensor(s) 338 and drive(s) 340 discussed above in the context of FIG. 3. In some embodiments, robotic device architecture 400 can include one or more cameras, including but not limited to, ToF camera 450 and RGB camera 452, where the one or more cameras can include one or more still cameras and/or one or more video cameras.

Figure 5:
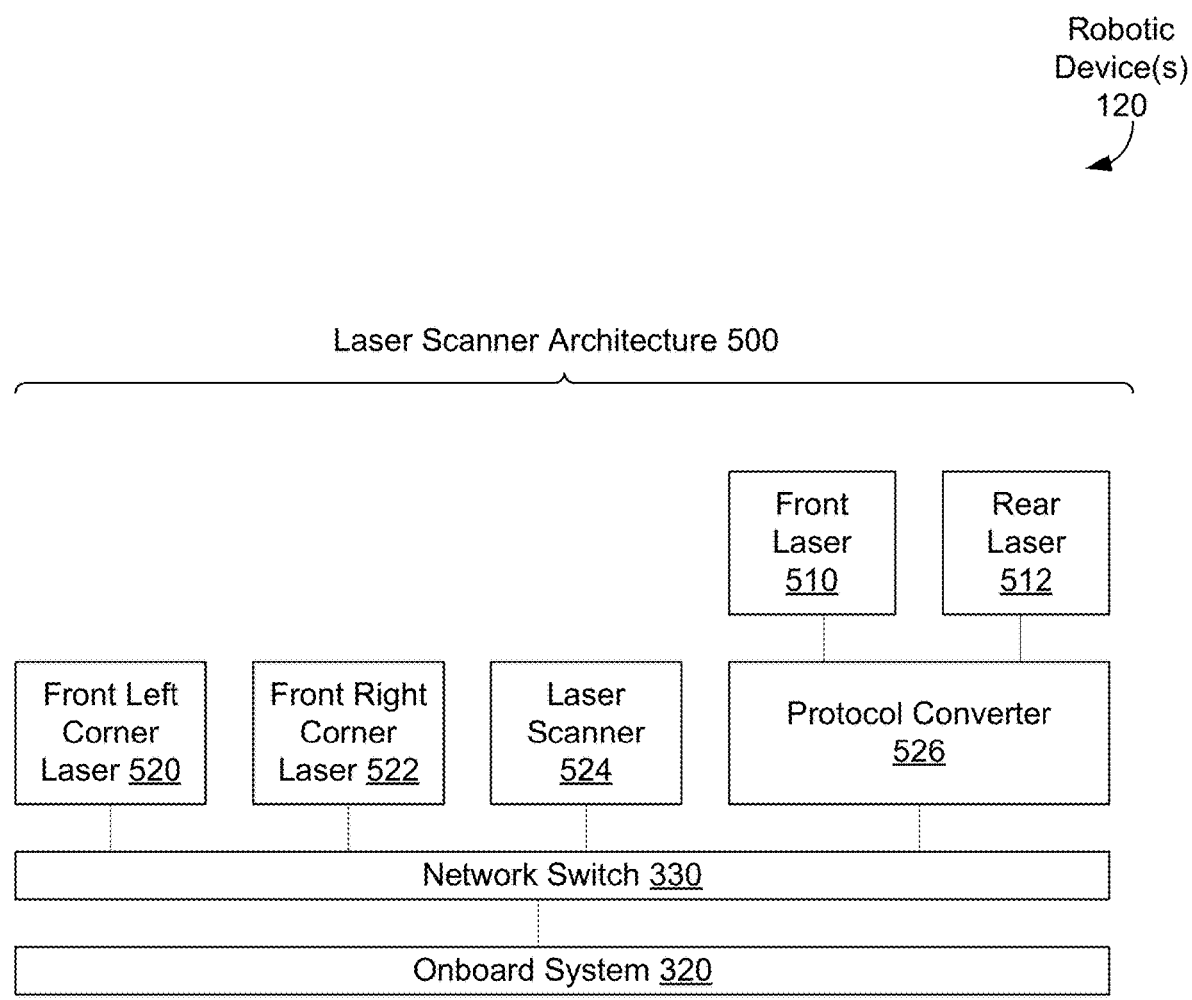
FIG. 5 illustrates a laser scanner architecture for one or more robotic devices, in accordance with an example embodiment.

FIG. 5 illustrates laser scanner architecture 500 for robotic device(s) 120, in accordance with an example embodiment. In some embodiments, some or all of device sensor(s) 338 can be lasers and laser scanners illustrated by laser scanner architecture 500.

Laser scanner architecture 500 can include lasers 510, 512, 520, 522, laser scanner 524, protocol converter 526, network switch 330, and onboard system 320. Lasers 510, 512, 520, and 522 can be located at fixed positions of robotic device(s) 120; for example, laser 510 can be located at the front of a robotic device, laser 512 can be located at the rear of the robotic device, laser 520 can be located at a front left corner of the robotic device, and laser 522 can be located at a front right corner of the robotic device. Lasers 510, 512, 520, 522, and/or laser scanner 524 can provide information to localize the robotic device within an environment. In some embodiments, lasers 510, 512, 520, 522, and/or laser scanner 524 can emit light that is reflected off of one or more reflectors—the reflected light can be detected by one or more laser sensors, and the robotic device can be localized within the environment based on a duration of time taken to detect the reflected light. In particular of these embodiments, some or all of lasers 510, 512, 520, 522, and/or laser scanner 524 can include one or more laser sensors for detecting reflected laser light. Then, some or all of lasers 510, 512, 520, 522, and/or laser scanner 524 can generate data, including but not limited to, data related to a laser (e.g., maintenance data for the laser), data related to light emitted by the laser, and data related to one or more durations of time taken to detect reflected laser light by the laser sensor(s).

As illustrated in FIG. 5, some lasers, such as lasers 520, 522, and laser scanner 524 can be directly connected to network switch 330, while other lasers, such as lasers 510, 512, can be connected to network switch 330 via protocol converter 526. Protocol converter 526 can convert a communications protocol used by a laser, such as laser 510 and/or 512, to a communications protocol used by network switch 330; e.g., convert from a communications protocol based on RS-422 to a communications protocol based on Ethernet. Then, lasers 510, 512, 520, 522, and laser scanner 524 can send data to and receive commands from onboard system 320 via network switch 330 and perhaps protocol converter 526.

In some embodiments, robotic device(s) 120 can be subject to one or more failure conditions. Examples of those failure conditions and related recovery strategies are described in Table 1 below.

TABLE 1

| Name | Summary | Recovery Strategy |
| --- | --- | --- |
| Stale Localization | Localization system is unable to determine robotic device pose and/or localization certainty estimate has exceeded bounds. | Robotic device will halt and notify human operator. The operator can intervene by manually driving robotic device to a location for re-localization and reengaging. |
| Trajectory Following | Trajectory following error exceeds threshold. | Robotic device will halt and attempt to restart trajectory following automatically. If system fails twice in a row then human operator will be notified. The operator can intervene by manually driving robotic device back onto roadmap. |
| No Safe Trajectory | Due to obstacle proximity, the trajectory planner cannot find a safe trajectory that would keep the robotic device a safe distance from known obstacles. | Robotic device will halt and notify human operator. The operator can intervene by manually driving robotic device around obstacle. |
| Hardware Fault | Steering/traction drive fault or other low-level hardware I/O fault condition | Robotic device will halt and notify human operator. The operator can power-cycle and manually drive robotic device back onto roadmap. |
| Pallet Detection Failure | Robotic device expected to discover a pallet at commanded location; no pallet was found | Robotic device will send message to a control service that includes sensor data relative to where the pallet was expected to be discovered. The control service will notify human operator and optionally may send pallet pose information manually. |
| Pallet Pose Estimation Failure | Robotic device could not determine pose of pallet relative to robotic device at high confidence. | Robotic device will send message to a control service that includes sensor data relative to where the pallet was expected. The control service will notify human operator and send pallet pose information manually. |

III. Localization of Robotic Vehicles within an Environment

Figure 6:
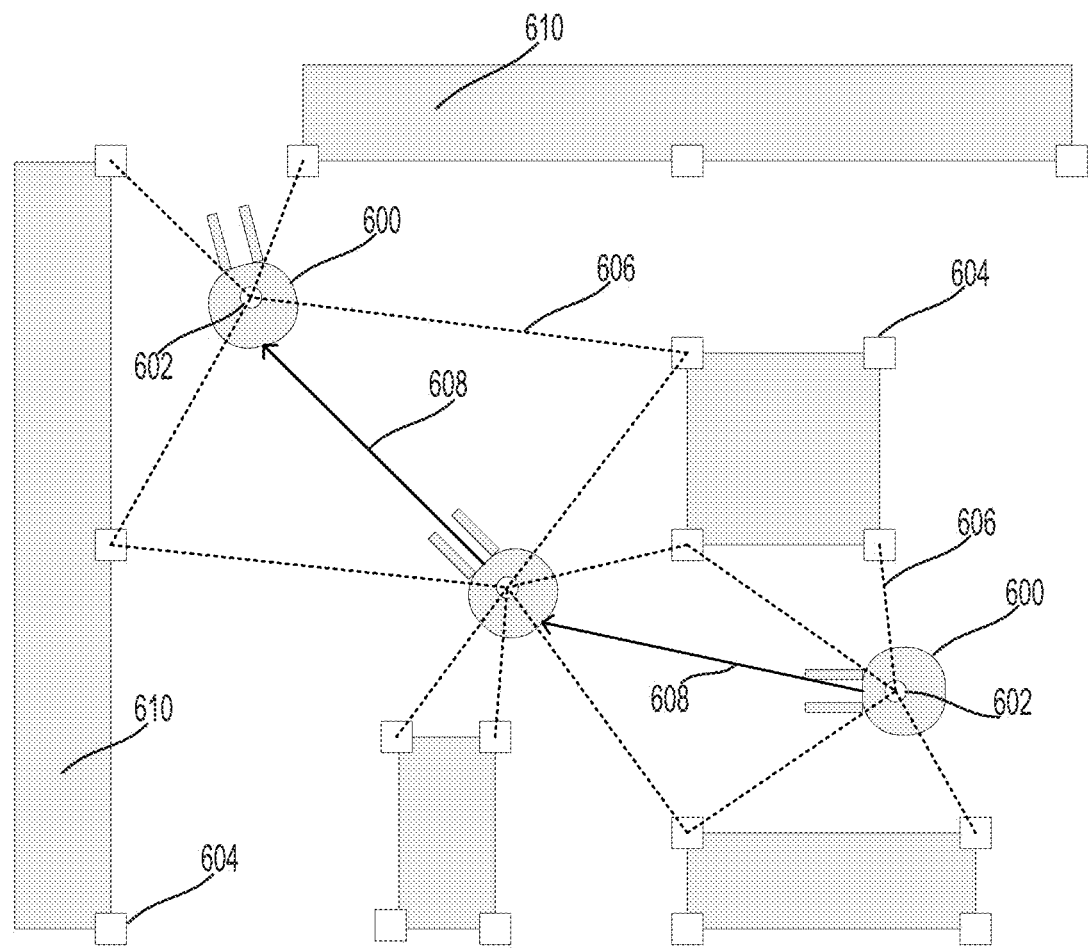
FIG. 6 illustrates a robotic vehicle navigating within an environment, in accordance with an example embodiment.

FIG. 6 shows a robotic vehicle navigating within an environment, according to an example embodiment. A location and orientation of a robotic vehicle 600 may be estimated, and the robot may navigate through the environment accordingly. The location and orientation of the robotic vehicle may be referred to as the "pose" of the robotic vehicle. The pose of the robotic vehicle may be estimated based on received signals 606 by one or more sensors 602 on the robotic vehicle. The received signals may be associated with landmarks 604 distributed throughout the environment. For example, the signals may be reflected by retroreflective markers placed in various locations in a warehouse. In this example, the robotic vehicle may include a light ranging and detection (LIDAR) unit that emits light to an area surrounding the robotic vehicle, and retroreflectors positioned in the area surrounding the robotic vehicle may reflect the light back to the robotic vehicle for detection by the one or more sensors of the robotic vehicle.

In some examples, the received signals may indicate locations of the landmarks relative to the robotic vehicle. Further, the locations of the landmarks within the environment may be predetermined. For example, the landmarks may be mapped. Matching the received signals with corresponding mapped landmarks may allow the pose of the robot within the environment to be inferred. For example, the robot may align the detected landmarks with the mapped landmarks to determine its position on the map. Further, the locations of the landmarks in relation to obstacles 610 within the environment may be predetermined. For example, the locations of obstacles may also be mapped. The robot may make movements 608 to navigate within the environment while avoiding the obstacles based on the estimated pose and the predetermined locations of the obstacles.

Figure 7:
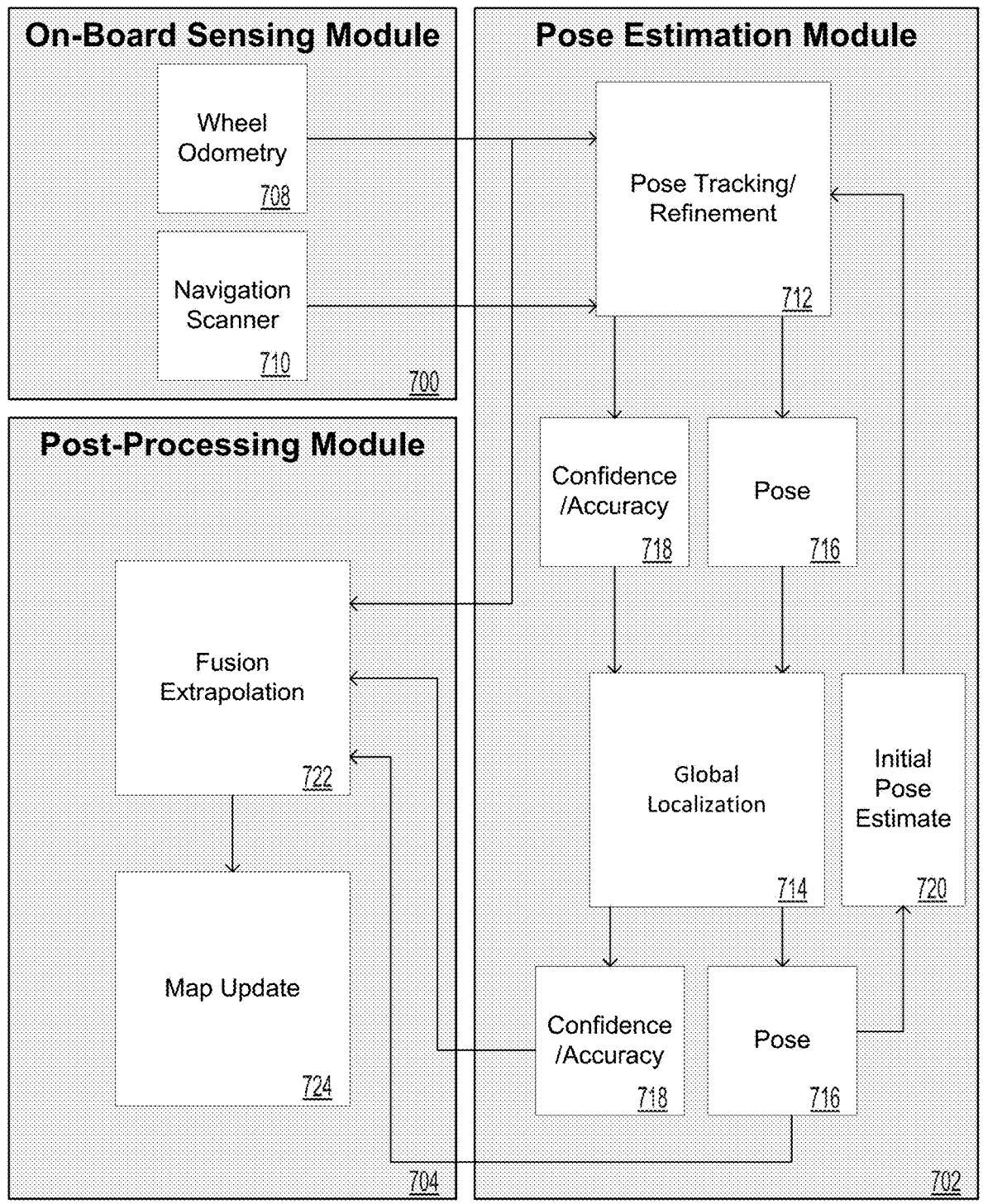
FIG. 7 is a functional block diagram illustrating modules of a robot control system, in accordance with an example embodiment.

FIG. 7 is a functional block diagram illustrating modules of a robot control system, according to an example embodiment. The robot control system may include one or more sensors as part of an on-board sensing module 700. The sensors may provide data that is indicative of wheel odometry 708 of the robotic vehicle. The sensors may also include a navigation scanner 710. The navigation scanner 710 may be configured to receive signals from candidate landmarks in an environment of the robot.

A pose estimation module 702 of the robot control system may indicate the location and orientation of the robotic vehicle with respect to mapped landmarks in the environment. The pose estimation module 702 may include software that performs functions based on inputs from the on-board sensing module 700. For example, each time the navigation scanner 710 performs a scan, sensor data from the on-board sensing module may be processed by the pose estimation module 702 to determine a current location and orientation of the robotic vehicle in the environment. The pose tracking/refinement block 712 and global localization block 714 of the pose estimation module 702 represent processing steps, while the pose block 716, confidence/accuracy block 718, and initial pose estimate block 720 represent outputs of the processing blocks 712 and 714.

The pose estimation module 702 may operate in two modes. In a first mode, the pose estimation module 702 may have an initial pose estimate 720 of the robot, and the pose tracking/estimate block 712 may update the initial pose estimate 720. The pose tracking/refinement 712 may utilize the wheel odometry 708 and data from the navigation scanner 710 in conjunction with the initial pose estimate 720 to identify the location of the robotic vehicle in relation to candidate landmarks. The pose tracking/refinement block 712 may associate the candidate landmarks to particular mapped landmarks that are near to the initial pose estimate 720. The pose estimation module 702 may further provide a pose estimate 716 based on the association, and a confidence/accuracy 718 of the pose estimate. The confidence/accuracy 718 may indicate that the initial pose estimate is adequate, or that it requires further refinement. Also in the first mode, the pose 716 and confidence/accuracy 718 determined by the pose tracking/refinement block 712 may be used in the post-processing module 704 to determine a refined pose estimate of the robot. Meanwhile, the global localization block 714 may be skipped. Further, the pose estimate 716 derived during pose tracking/refinement 712 may be treated as the initial pose estimate 720 of the robotic vehicle for use in subsequent pose estimations.

In a second mode, the pose estimation module 702 may have no initial indication of where the robotic vehicle is within the environment. In other words, the initial pose estimate 720 may not yet be determined. In the second mode, the pose estimation module 702 may utilize global localization 714 rather than pose tracking/refinement 712 to determine the pose of the robot. The global localization block 714 may test associations between the candidate landmarks and mapped landmarks across the entire environment of the robotic vehicle. The global localization block 714 may also output a pose estimate 716 and confidence/accuracy 718. Also in the second mode, the pose 716 and confidence/accuracy 718 determined by the global localization block 714 may be used in the post-processing module 704 to determine a refined pose estimate of the robot. Further, the pose estimate 716 derived during global localization 714 may be treated as the initial pose estimate 720 of the robotic vehicle for use in subsequent pose estimations.

A post-processing module 704 may be used to refine the pose estimation derived from the pose tracking/refinement or global localization. The post-processing module may perform fusion extrapolation 722 of the pose estimate and confidence/accuracy of the localization module, and wheel odometry of the on-board sensing module. During fusion extrapolation, the refined pose estimate may rely more on the estimated pose provided by the localization module when there is a high confidence/accuracy. Conversely, the refined pose estimate may rely more on the wheel odometry when there is a low confidence/accuracy. Further, the post-processing module may provide a map update 724 based on the provided confidence/accuracy and refined pose estimate. For example, the map update may update locations of the mapped landmarks based on the refined pose estimate. In other examples, the map update may update statistical information associated with the mapped landmarks used to generate the refined pose estimation.

Each of the functions performed by the robot control system of FIG. 7 may be performed periodically. For example, navigation scanner 710 may perform scans at 8 Hz, while the wheel odometry 708 may update at 100 Hz. As another example, the processing blocks 712 and 714 of the pose estimation module may receive data from the on-board sensing module at 8 Hz, and may produce poses 716 and confidence/accuracies 718 at 8 Hz. Different frequencies are possible as well.

Figure 8:
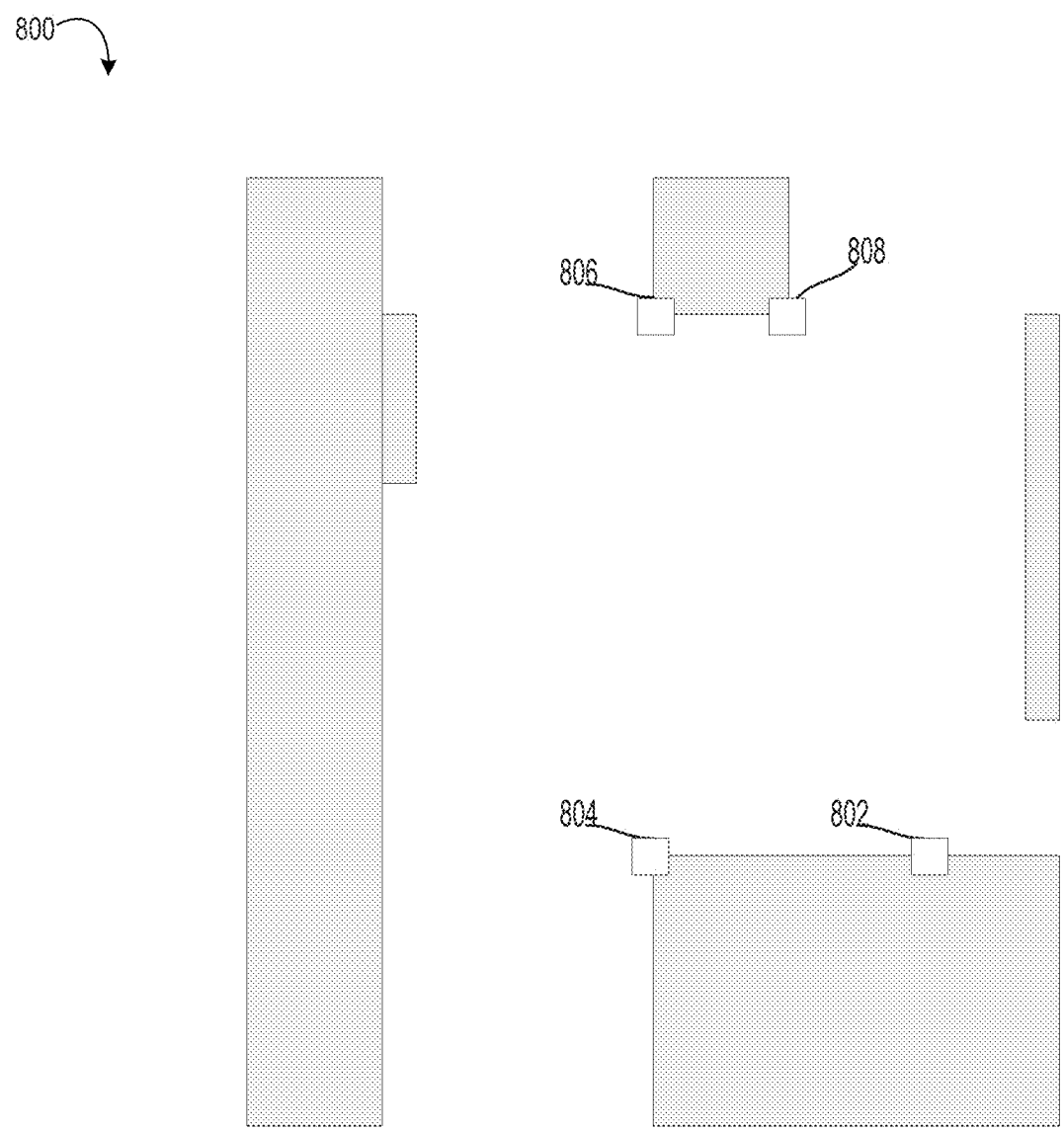
FIG. 8 shows a mapped environment of a robot, in accordance with an example embodiment.

FIG. 8 shows an environment of a robotic vehicle, according to an example embodiment. Generating a pose estimate of the robot may rely on predetermined locations of landmarks within the environment 800. For example, mapped landmark 802 may correspond to a first coordinate (x1, y1) on the map, mapped landmark 804 may correspond to a second coordinate (x2, y2), mapped landmark 806 may correspond to a third coordinate (x3, y3), and mapped landmark 808 may correspond to a fourth coordinate (x4, y4). In this example, only an x and y axis may be relevant, because the mapped landmarks may be distributed on a substantially horizontal marker plane. For example, each landmark the environment 800 may be positioned at a height (corresponding to a z axis) of 5 feet above the floor. In other examples, the mapped landmarks may correspond to ranges of coordinates on a map. For example, the ranges of coordinates may correspond to sizes of the various landmarks. In still other examples, the mapped landmarks may correspond to three-dimensional (3-D) coordinates on a (3-D) map. Other ways of representing locations of the mapped landmarks are possible as well.

In some example embodiments, the mapped landmarks may be retroreflective markers configured to reflect light back to a source of the light. In such examples, the robotic vehicle may include a light ranging and detection (LIDAR) unit configured to emit light to an area surrounding the robot. The retroreflective markers may reflect signals from the LIDAR unit back to the robotic vehicle. The robotic vehicle may include one or more sensors of the robotic vehicle, which may be configured to receive reflected signals from the retroreflective markers and detect locations of the markers relative to the robotic vehicle.

Figure 9:
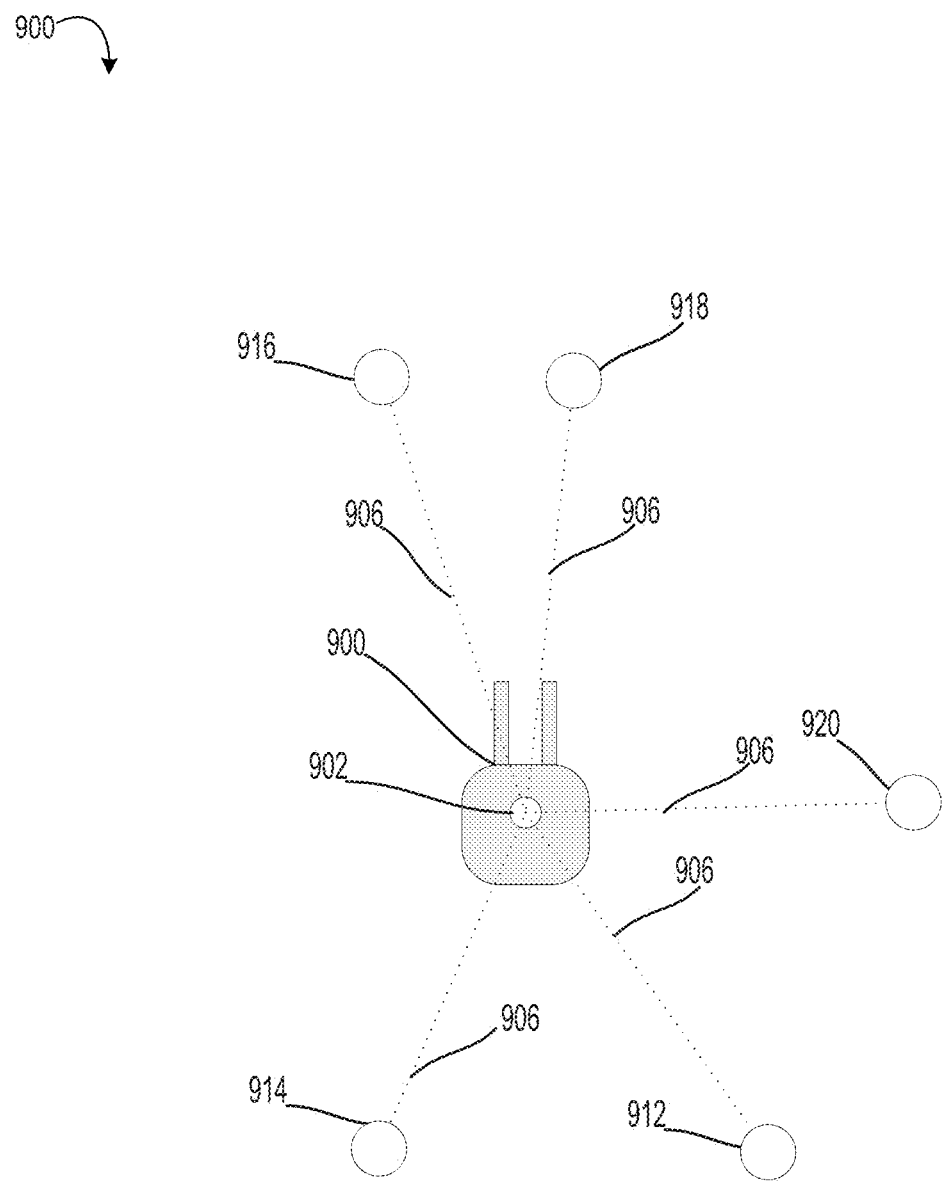
FIG. 9 shows a robot having made a number of detections, in accordance with an example embodiment.

FIG. 9 shows a robotic vehicle having made a number of detections, according to an example embodiment. Generating a pose estimate of the robotic vehicle may further rely on signals 906 detected by one or more sensors 902 of the robotic vehicle 900. In one example, the signals may be associated with candidate landmarks 912, 914, 916, 918, and 920. The signals may be indicative of locations of the candidate landmarks in relation to the robot. For example, candidate landmark 912 may correspond to a radius relative to the robotic vehicle 900 (r1) and an angle relative to the robotic vehicle 1000 ($\alpha 1$), candidate landmark 1014 may correspond to a radius (r2) and an angle ($\alpha 2$), candidate landmark 1016 may correspond to a radius (r3) and an angle ($\alpha 3$), candidate landmark 1018 may correspond to a radius (r4) and an angle ($\alpha 4$), and candidate landmark 1020 may correspond to a radius (r5) and an angle ($\alpha 5$). In other examples, the candidate landmarks may be represented by Cartesian coordinates relative to the robotic vehicle 900. Other ways of representing locations of the candidate landmarks relative to the robotic vehicle are possible as well.

In some examples, the locations of the candidate landmarks may be determined by at least one sensor on the robotic vehicle. That is, a sensor may receive signals indicative of locations of candidate landmarks. The sensor may generate sensor data representative of the received signals, and may determine the locations of the candidate landmarks based on the sensor data. A control system of the robot may then receive the locations of the candidate landmarks from the sensor. In other examples, at least one sensor may generate raw sensor data and one or more processors of the robot may process the raw sensor data to determine the locations of the candidate landmarks. For example, the processors may identify signals from a sensor on the robot that have an intensity greater than an intensity threshold value. In still other examples, processors that are remote from the robot may detect the locations of the candidate landmarks based on the sensor data. Other ways of determining the locations of the candidate landmarks are possible as well.

The candidate landmarks may or may not correspond to a mapped landmark. For example, candidate landmarks 912, 914, 916 and 918 may correspond to mapped landmarks (e.g. the mapped landmarks 802, 804, 806, and 808 of FIG. 8), while candidate landmark 920 may correspond to a false detection. False detections may make it difficult to align the candidate landmarks with corresponding mapped landmarks, and thus may hinder accurate pose estimates of the robotic vehicle. Example embodiments follow that describe methods of vetting the candidate landmarks to achieve accurate pose estimates.

FIGS. 10A, 10B, 10C, and 10D illustrate determination of inliers associated with a sample set of candidate landmarks and corresponding mapped landmarks, according to an example embodiment. FIG. 10A shows a mapped environment of a robotic vehicle. Mapped landmarks 1002, 1004, 1006, and 1008 have predetermined locations. FIG. 10B shows a robotic vehicle having made a number of detections. The detections correspond to candidate landmarks 1012, 1014, 1016, 1018, and 1020. For purposes of the present example, candidate landmark 1020 corresponds to a false detection, while the other candidate landmarks correspond to mapped landmarks. To estimate a pose of the robotic vehicle and to determine which, if any, of the candidate landmarks correspond to false detections, sample sets of the candidate landmarks mapped landmarks may be selected.

In the example embodiment, a sample set is determined that includes candidate landmarks 1012, 1014, and 1020, and corresponding mapped landmarks 1002, 1004, and 1006. In the present example, three candidate landmarks have been sampled. However, different numbers of sampled landmarks are possible as well. For example, the number of sampled landmarks may relate to a percentage of the total number of candidate landmarks.

In some embodiments, sampling the candidate landmarks may be performed pseudo-randomly. In other embodiments, sampling the candidate landmarks may be performed in an ordered fashion. For example, sampling the candidate landmarks may be performed in order of angle relative to the robot. In other examples, sampling the candidate landmarks may be performed in order of radius relative to the robot. In still other examples, the first candidate landmark may be chosen pseudo-randomly, and the other candidate landmarks may be sampled based on their proximity to the first candidate landmark. In yet other examples, the candidate landmarks may be chosen based on a desired geometry. For example, the candidate landmarks that most closely resemble an isosceles triangle may be sampled. In another example, the candidate landmarks that most closely resemble a line may be sampled. Other ways of sampling the candidate landmarks are possible as well.

In some embodiments, corresponding mapped landmarks may be selected in a similar fashion to the sampled candidate landmarks. In other embodiments, corresponding mapped landmarks may be sampled that form a similar geometry to the sampled candidate landmarks. In present example, sampled mapped landmarks 1002, 1004, and 1006 most closely resemble the geometry formed by the sampled candidate landmarks 1012, 1014, and 1020. Other ways of sampling the corresponding mapped landmarks are possible as well.

In some embodiments, several sample sets may be determined, each including a different combination of candidate landmarks and corresponding mapped landmarks. Each of the sample sets may be vetted to determine which ones adequately represent the pose of the robot.

FIG. 10C shows a transformation determined based on a sample set that has been applied to all of the candidate landmarks. A transformation may be determined for the sample set that relates the sampled subset of candidate landmarks to the corresponding mapped landmarks. For example, the transformation may translate and rotate the candidate landmarks so as to minimize distances between the sampled candidate landmarks and the corresponding mapped landmarks. In this example embodiment, sampled candidate landmarks 1012, 1014, and 1020 have been oriented to minimize the overall distance from corresponding mapped landmarks 1004, 1006, and 1002. A least squares method such as an iterative closest point (ICP) algorithm may achieve this alignment. Any similar algorithm may appropriately align the sampled subset of candidate landmarks with the corresponding mapped landmarks. Other transformations are possible as well.

While the transformation may be determined based on the sampled subset of candidate landmarks and corresponding mapped landmarks, the transformation may be applied to all of the candidate landmarks. In the present example, the transformation is applied to non-sampled candidate landmarks 1016 and 1018 in addition to the sampled candidate landmarks.

Once the determined transformation has been applied to the candidate landmarks, the distances between the transformed candidate landmarks and neighboring mapped landmarks may be determined. A neighboring mapped landmark corresponding to a particular transformed candidate landmark may be a closest mapped landmark after the transformation is applied. In some examples, each mapped landmark may only serve as a neighboring mapped landmark to one transformed candidate landmark. In this example, mapped landmark 1002 is a neighboring mapped landmark of transformed candidate landmark 1020, mapped landmark 1004 is a neighboring mapped landmark of transformed candidate landmark 1012, and mapped landmark 1006 is a neighboring mapped landmark of transformed candidate landmark 1014.

The transformation may be generally indicative of a potential pose of the robot 1000. The distances between the transformed candidate landmarks and the neighboring landmarks may indicate whether or not the transformation presents a viable pose. For example, a number of inliers associated with the transformation may be determined.

FIG. 10D shows a number of inliers associated with transformed candidate landmarks, according to an example embodiment. Each of the inliers may be determined based on an inlier distance threshold. The inlier distance threshold may be indicative of whether a transformed candidate landmark is adequately aligned with any of the mapped landmarks. In the present example, the inlier distance threshold is represented by radii 1030, 1032, and 1034, which encircle transformed candidate landmarks 1020, 1012, and 1014 respectively. Any transformed candidate landmark within the threshold distance of a neighboring mapped landmark may be considered an inlier. In the present example, transformed candidate landmarks 1012, 1014, and 1020 may be considered inliers. Not depicted in FIG. 10D are candidate landmarks 1016 and 1018, which are not considered inliers.

Also not depicted in FIG. 10D is mapped landmark 1008 which is not within the inlier distance threshold of any of the transformed candidate landmarks.

A sampled subset that includes a false detection may result in a transformation that does not adequately represent the pose of the robot. In the present example, candidate landmarks 1012, 1014, 1016, and 1018 correspond to mapped landmarks, respectively, while candidate landmark 1020 corresponds to a false detection. FIGS. 10C and 10D show an example embodiment of a transformation that does not adequately represent the pose of the robot because the sampled subset includes a false detection.

In the present example, three inliers are determined from five transformed candidate landmarks. In other words, three out of five candidate landmarks can be considered adequately aligned based on the transformation. It may be determined that three out of five candidate landmarks having inliers does not correspond to a viable transformation, which in turn does not indicate a viable pose of the robot. Other factors may contribute to a determination that the transformation is not viable. In FIGS. 11A-D, for example, none of the non-sampled candidate landmarks are associated with an inlier. It may be common for the transformed sampled candidate landmarks to be associated with inliers, because the determined transformation is meant to best align the sampled candidate landmarks to the corresponding mapped landmarks. Thus, whether the non-sampled candidate landmarks are associated with inliers may be given more weight in determining the viability of the transformation. In examples where the number of inliers is determined to be insufficient, other candidate landmarks and corresponding mapped landmarks may be sampled, the other candidate landmarks may be transformed, and a number of inliers associated with the other candidate landmarks may be determined.

FIGS. 11A, 11B, 11C, and 11D illustrate determination of inliers associated with another sample set of candidate landmarks and corresponding mapped landmarks, according to an example embodiment. FIG. 11A shows the same mapped environment of a robotic vehicle as depicted in FIG. 10A. Similarly, FIG. 11B shows a robotic vehicle having made the same detections as those depicted in FIG. 11B. However, FIGS. 11A and 11B depict a different sample set. In the present example, candidate landmarks 1114, 1116, and 1118 and corresponding mapped landmarks 1104, 1106, and 1108 are sampled. FIG. 11C shows a transformation determined from the sample set as applied to all of the candidate landmarks. In the present example, the transformation is determined based on sampled candidate landmarks 1114, 1116, and 1118 and corresponding mapped landmarks 1104, 1106, and 1108. The transformation is also applied to non-sampled landmarks 1112 and 1120. FIG. 11D shows a number of inliers associated with transformed candidate landmarks aligned with map landmarks. Sampled candidate landmarks 1114, 1116, and 1118 are inliers because they correspond to neighboring mapped landmarks 1104, 1106, and 1108, which are within radii 1134, 1136 and 1138 of the sampled candidate landmarks. Non-sampled candidate landmark 1112 is also an inlier, because neighboring mapped landmark 1102 is within radius 1132 of candidate landmark 1112. However, candidate landmark 1120 is an outlier, because no mapped landmarks fall within an inlier threshold distance associated with candidate landmark 1120.

FIG. 11D shows an example embodiment that includes four inliers out of five candidate landmarks. It may be determined that four out of five candidate landmarks having inliers corresponds to a viable transformation, which in turn indicates a viable pose of the robot. This determination may be made because there are a total of four sampled and neighboring landmarks 1102, 1104, 1106, and 1108. Thus, determining four inliers in the present example is indicative of a transformation that adequately aligns candidate landmarks with each and every relevant mapped landmark. Other factors may contribute to a determination that the transformation is viable. In FIG. 11D, for example, one of the non-sampled candidate landmarks is associated with an inlier. It may be significant for non-sampled candidate landmarks to be associated with an inlier, because a transformation that derives from one or more false detections is less likely to allow for inliers associated with non-sampled candidate landmarks, as shown by FIGS. 11A-11D.

In the present example, the transformation may be deemed viable. As such, the sample set from which the transformation may be selected and a pose estimate may be determined based on the transformation. For example, the pose of the robotic vehicle may be estimated based on the inliers associated with the selected sample set. Further, any outliers associated with the sample set may be determined to correspond to false detections. In the present example, candidate landmark 1120 may be determined to correspond to a false detection.

FIGS. 11A-11D show that a sampled subset that only includes candidate landmarks that correspond to mapped landmarks may result in a transformation that adequately represents the pose of the robot. While FIGS. 10A-10D showed how false detections far from any mapped landmarks can render a transformation inadequate, and thus result in a poor pose estimate, false detections may be used to assist in determining a confidence level associated with the pose estimate. Example embodiments follow that describe methods of using false detections to determine a confidence level associated with a pose estimate.

As described above with regard to FIG. 7, a confidence level may be associated with each pose estimate of a robotic vehicle. The confidence level may be determined based on the number of inliers associated with a transformation of detected candidate landmarks and the total number of detected candidate landmarks. For example, the present example includes four inliers out of five candidate landmarks. A confidence level of the resulting pose estimate may be based on a ratio of the number of inliers to the total number of candidate landmarks. In this example, a ratio close to one would indicate a high likelihood of an accurate pose estimate. Conversely, a ratio close to zero would indicate a low likelihood of an accurate pose estimate. In another example, the confidence level may be based on a ratio of the number of inliers to the number outliers. In this example, a ratio much greater than one, such as five, would indicate a high likelihood of an accurate pose estimate, while a ratio closer to, or less than, one would indicate a low likelihood of an accurate pose estimate. Other ways of measuring a confidence level are possible as well.

In some examples, the pose estimation confidence may be considered in determining a refined pose estimate. For instance, a selected sampled subset with a high pose estimation confidence may be the primary contributor to the refined pose estimate. A selected sampled subset with a low pose estimate confidence may be a secondary contributor to the refined pose estimate. For example, the refined pose estimate may derive from wheel odometry moreso than from the selected sample set. In this way, completing the pose estimate may be reminiscent of Kalman filtering.

Figure 12:
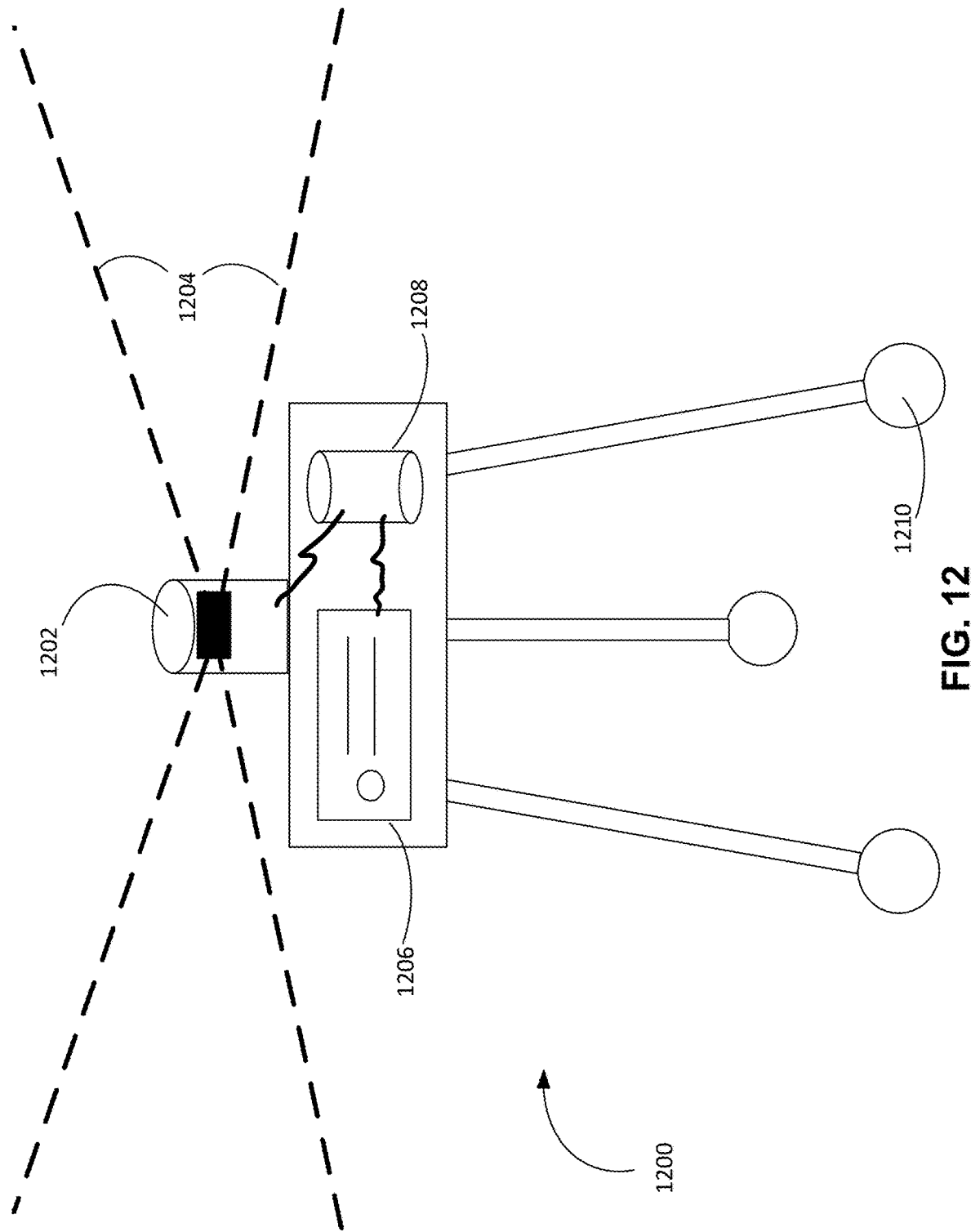
FIG. 12 illustrates a manually-operated sensor device, in accordance with an example embodiment.

FIG. 12 illustrates a manually-operated sensor device, in accordance with an example embodiment. The example device 1200 may be used for pre-mapping a space. More specifically, the device includes a sensor 1202 configured to collect sensor data representative of an environment, such as an environment of a robotic vehicle, in which one or more robotic vehicles may later be deployed. In some examples, the sensor 1202 may be a two-dimensional navigation laser sensor capable of producing distance measurements to surfaces in the environment, as well as locations of detected markers. In particular, the sensor 1202 may project laser light beams 1204 and measure reflected beams to measure distance. The sensor 1202 may be mounted at a same height as a sensor on a robotic vehicle to be deployed within a space in order to replicate detection capability of the robotic vehicle. For instance, the sensor 1202 may be positioned at a height to detect retroreflective reflectors arranged in a horizontal plane within an environment. In other examples, the sensor 1202 may be a two-dimensional laser scanner that only produces distance or contour measurements. In further examples, the sensor 1202 may be another type of sensor, such as a stereo camera.

The device additionally includes a computing unit 1206 that processes the sensor data from sensor 1202. In particular, computing unit 1206 may be configured to run any of the types of mapping functionality described herein to generate maps of the space and/or use generated maps. The device additionally includes a battery pack 1208 for powering both the sensor 1202 and the computing unit 1206. The device further includes a mobile base 1210 that allows the device to be easily moved through a space in advance of deploying one or more robotic vehicles. For instance, the mobile base 1210 may be a tripod on wheels as shown in FIG. 12. Other types of mobile bases may be used, including power and/or unpowered mobile bases.

Within examples, the application of automated guided vehicles (AGVs) and optimization of warehouses (with or without AGVs) may require accurate geometric information about the environment (e.g., accurate maps). Accurate facility maps may lead to identification of facility/workflow inefficiencies in both manual and automatic vehicle environments (e.g., racks too close together to allow two power industrial trucks to pass). Facility layouts (e.g., CAD models) are used to guide the building design and construction process, and may not always updated to reflect the real world. Therefore, they often contain inaccuracies and may not be considered trustworthy (e.g., a CAD may contain correct and accurate walls while racks and other infrastructure added later may be off by considerable amounts, e.g., 30 centimeters). In some examples, a pre-mapping device such as shown in FIG. 12 may be used to help generate accurate facility maps that enable optimized AGV and/or manual fork truck deployments.

A pre-mapping system may be used for a number of different applications. In some examples, a map of a warehouse (e.g., a geometric map containing walls and other infrastructure such as racks) may be generated and compared to an existing CAD model of the space. This process may reveal that the CAD model does not properly reflect the real world. Facility maps may then be updated to the correct layouts. In further examples, warehouse mapping may be used to deploy a robotic system in simulation to demonstrate how the warehouse can be automated using robotic AGVs and/or optimized using manually-driven powered industrial trucks.

In additional examples, a warehouse space may be pre-mapped to assist in planning a reflector setup (e.g., locations to place reflectors in the environment) based on the map. Such a process may be used to speed up the planning phase of an AGV deployment. In further examples, a warehouse map and reflector setup may be determined early in the AGV rollout process before sending any vehicles to the location (or while the vehicles are shipped to save time). Once vehicles arrive, they may upload the map(s) and start driving or use the map(s) to initialize and bootstrap subsequent mapping runs with vehicles.

In further examples, accurate mapping can also be used to determine if a new generation of manual trucks will be able to operate in an existing facility or if the facility will require modification. In additional examples, accurate maps also allow for identification of manual facility inefficiencies like placement of racking, charging stations, or parking stations relative to workflows and travel distances. This information may be used to provide suggestions for more optimal facility layouts.

As mentioned, the computing unit 1206 may be configured to run various mapping functionality based on sensor data collected by sensor 1202. In some examples, the mapping functionality may include a hierarchical pose graph SLAM and bundle adjustment to build both a warehouse map and a reflector map. The functionality may produce both maps by switching between contours/distance measurements and reflector detections in order to map a warehouse with only a partial reflector setup or no reflector setup at all. The mapping functionality may additionally include automatically aligning generated maps with the CAD model of the warehouse. The mapping functionality may additionally include bootstrapping the mapping process with a previously built map (e.g., a new map may be automatically aligned with both a CAD model and a previous map, with reflector positions bootstrapped from the previous map).

An example process may include retrieving results of a mapping run using the device illustrated in FIG. 12, including storage, visualization, etc. The retrieved results may then be applied for various functions, including uploading to vehicles for navigation, uploading to vehicles for new mapping runs (bootstrapped with results from the prior run), importing the results into a component that shows deployment of a system in simulation, importing the results into a component that compares a generated map with an existing CAD model, and/or importing the results into a component that assists with automated reflector planning.

Figure 13:
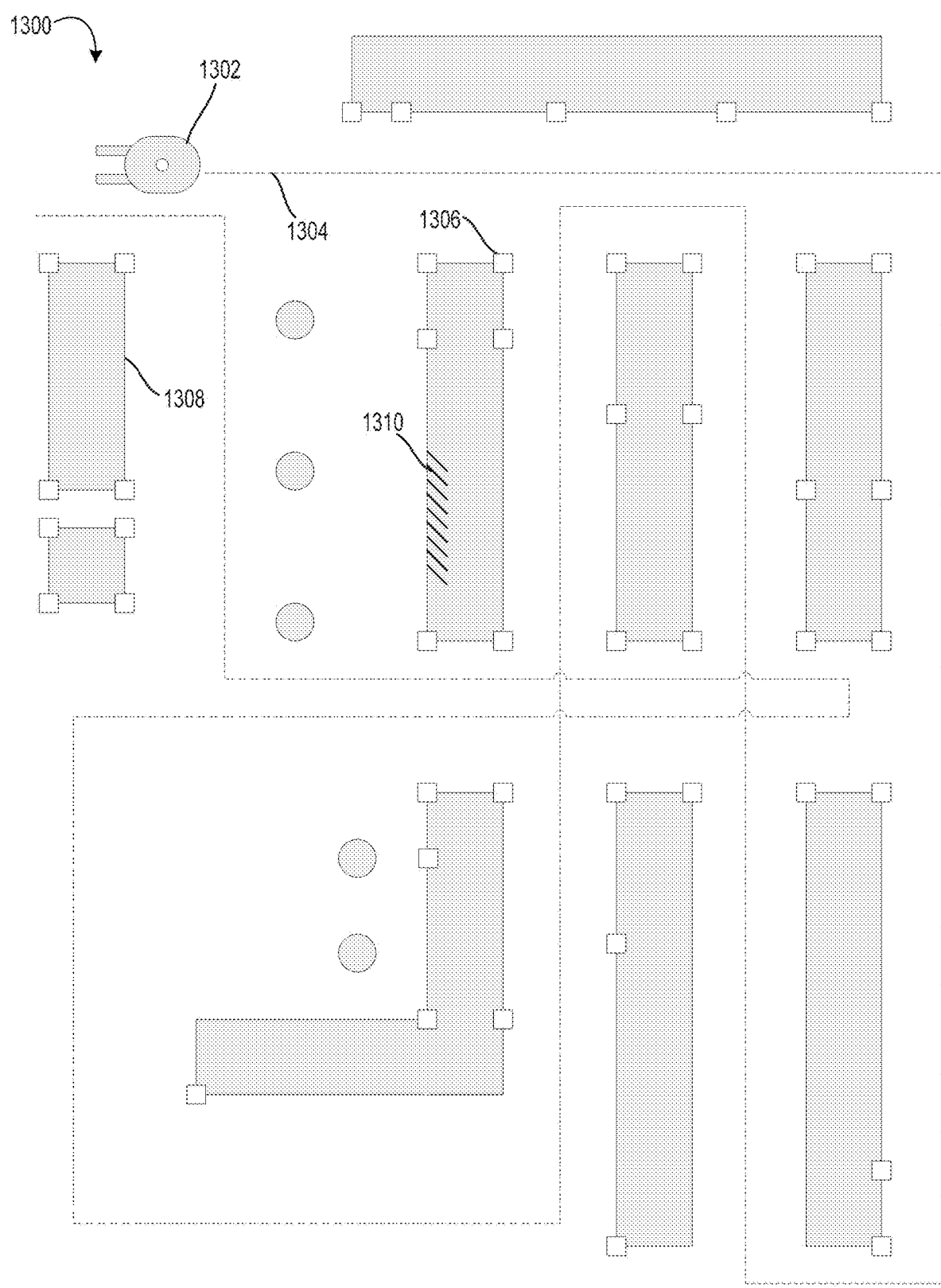
FIG. 13 illustrates a robotic vehicle navigating through an environment, in accordance with an example embodiment.

FIG. 13 illustrates a robotic vehicle navigating through an environment, in accordance with an example embodiment. Environment 1300 may include several obstacles 1308 with landmarks 1306 placed thereon. The environment may also include false detection sources 1310.

While navigating through environment 1300, robotic vehicle 1302 may detect the landmarks within the environment to estimate its pose as described above with regard to FIG. 6 at several points along path 1304. Such detections may be used to generate a map indicative of a localization viability metric associated with each landmark 1306.

In some examples, FIG. 13 may be representative of a robotic vehicle 1302 being manually navigated through environment 1300 to obtain sensor data indicative of the environment. For example, before robotic vehicles have been deployed within the environment, a robotic vehicle may be manually navigated for purposes of generating the map of the environment and determining whether the environment is suitable for automatic navigation of robotic vehicles through the environment. The map may indicate that there are too few landmarks at a portion of the environment (i.e. that additional landmarks are needed to viably localize the robotic vehicle), that certain of the landmarks should be moved, or that certain of the landmarks should be removed. A human operator or a robot may effectuate such changes based on the indications on the map.

In this way, robotic vehicle 1302 may perform the functions described above with regard to the manually-operated sensor device of FIG. 12. However, in other examples, FIG. 13 may be representative of a robotic vehicle 1302 automatically navigating itself through environment 1300. Such may be the case after robotic vehicles have been deployed and are performing tasks within environment 1300. In such scenarios, the indications on the map may be used to refine the number or placement of landmarks 1306 within environment 1300.

Figure 14:
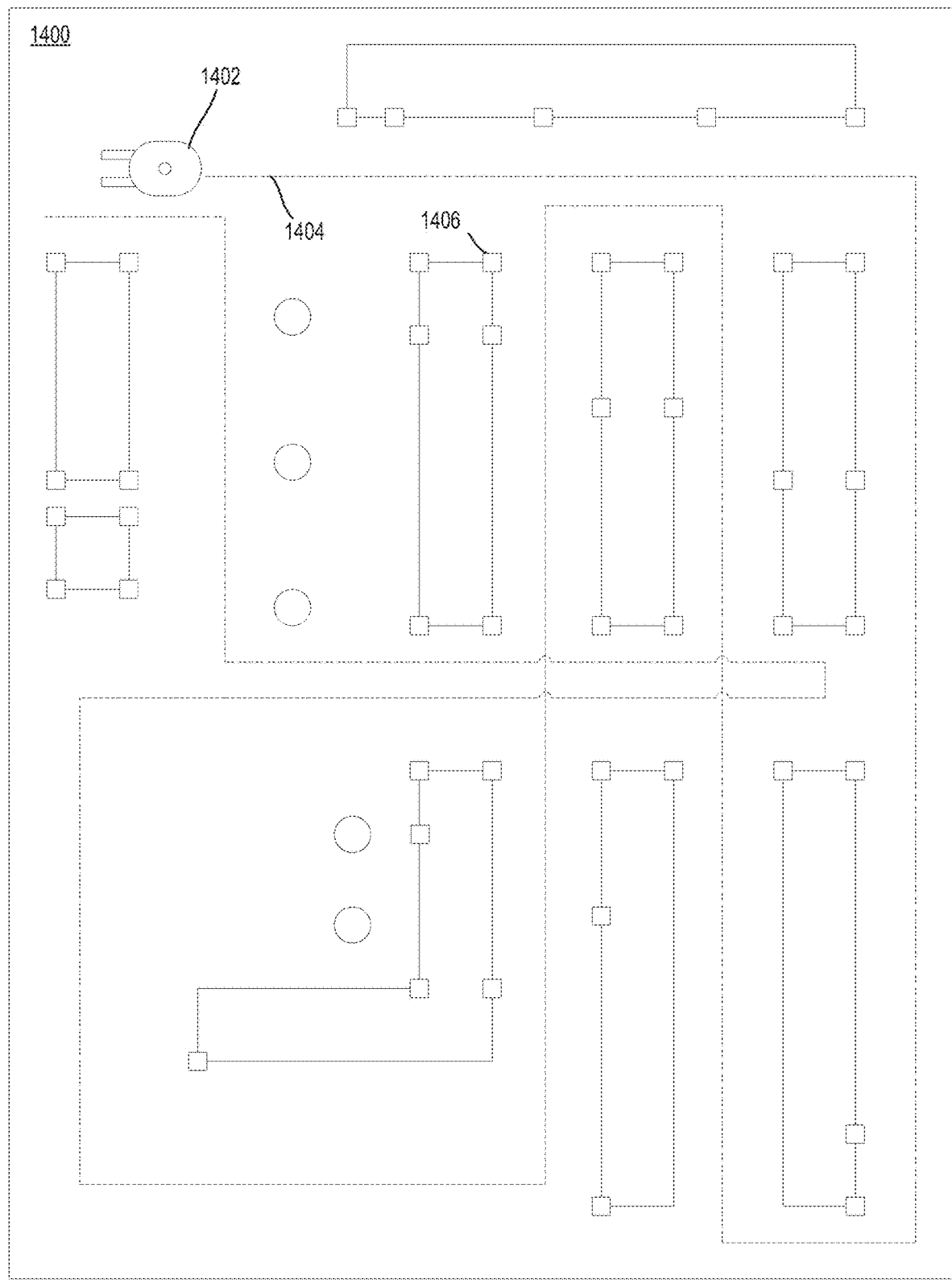
FIG. 14 illustrates a map of an environment of a robotic vehicle, in accordance with an example embodiment.

FIG. 14 illustrates a map of an environment of a robotic vehicle, in accordance with an example embodiment. In the present example, map 1400 includes an indication of the position of robot 1402 within the environment, an indication of the path 1404 of robotic vehicle 1402, indications of landmarks 1406 placed within the environment, and other features of the environment. As described above with regard to FIG. 13, such features of the environment, such as obstacles 1308 of FIG. 13, may be derived from a CAD model of the environment or from scans performed by robotic vehicle 1402. The indications of the path 1404 may be based on localization of the robotic vehicle 1404 within the environment as it navigates therein, and indications of the landmarks 1406 may be based on detections of the robotic vehicle 1402.

Depicting the position of robotic vehicle 1402 within the environment may be particularly useful while navigating robotic vehicle 1402 through the environment. For example, before deployment of robotic vehicles, a human operate may navigate the robotic vehicle, and map 1400 may be provided on robotic vehicle 1402. As such, the human operator may be able to determine which parts of the map need to be surveyed using robotic vehicle 1402, and can determine which portions of the environment are inadequate for purposes of localizing robotic vehicles.

Though map 1400 includes an indication of the position of robotic vehicle 1402, such might not always be the case. For instance, where several robotic vehicles provide data for incorporation in map 1400, a comprehensive view of indications of localization viability may be used. For example, multiple paths, such as path 1404 may be overlayed on map 1400, or an average of such paths may be provided for display.

Figure 15A:
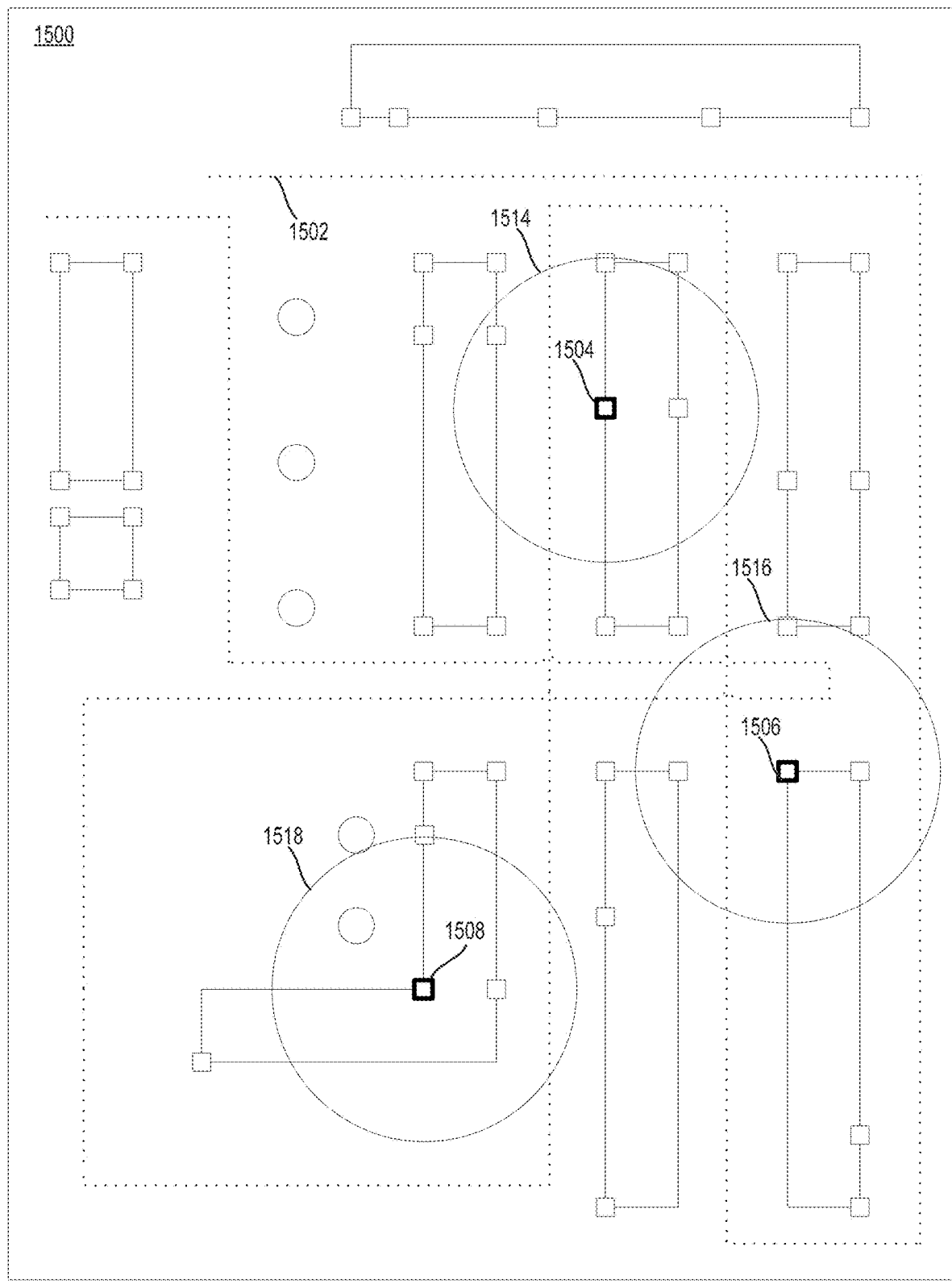
FIGS. 15A and 15B illustrate another map of an environment of a robotic vehicle, in accordance with an example embodiment.

FIG. 15A illustrates another map of an environment of a robotic vehicle, in accordance with an example embodiment. The present example illustrates a basis for determining a localization viability metric associated with each landmark within the environment. Map 1500 includes a representation of a path 1502 of a robotic vehicle. Each dot of the representation of path 1502 may correspond to a position in the environment at which the robotic vehicle detected candidate landmarks placed within the environment.

In the present example, a frequency of detection may be determined for each landmark, and the localization viability metric associated with each landmark may be based on the determined frequency. For purposes of example, landmarks 1504, 1506, and 1508 have been highlighted in FIG. 15A, but it should be understood that detection frequencies may be calculated for any or all landmarks within the environment.

To calculate the detection frequency, a total number of positions at which each landmark was detected may be determined. In the present example, the total number of positions used to determine the detection frequencies fall within regions 1514, 1516, and 1518, which correspond to landmarks 1504, 1506, and 1508 respectively. For each landmark, a number of positions within its corresponding region at which the landmark was detected may also be determined.

For example, region 1514 includes portions of an aisle in which landmark 1504 is placed and an adjacent aisle. In this example, landmark 1504 may be detected at each position within region 1514 that falls within the same aisle as landmark 1504, and that landmark 1504 is not detected at each position within region 1514 that falls within the adjacent aisle. Accordingly, the calculated detection frequency associated with landmark 1504 may be slightly over 50%. In contrast, landmark 1506 may be detected at nearly all positions within region 1506, and landmark 1508 may be detected at zero positions within region 1518.

In the present example, regions 1514, 1516, and 1518 include an area within a radius of landmarks 1504, 1506, and 1508 respectively. However, in this example, each landmark may be impossible to detect at certain of positions associated with path 1502. For instance, all such positions that fall within region 1518 are blocked from landmark 1508 by an obstacle. Accordingly, different types of regions may be used to determine a detection frequency associated with each landmark within the environment. For example, a region associated with each landmark may not include portions of the environment that are blocked from landmark. In such an example, the aisle adjacent to landmark 1504 may not be included within the region. In other examples, each position in the environment that is within a line of sight of the landmark may be included within the associated region. In still other examples, such regions may be manually defined. In yet other examples, the entire environment may serve as a region shared by each such position.

Figure 15B:
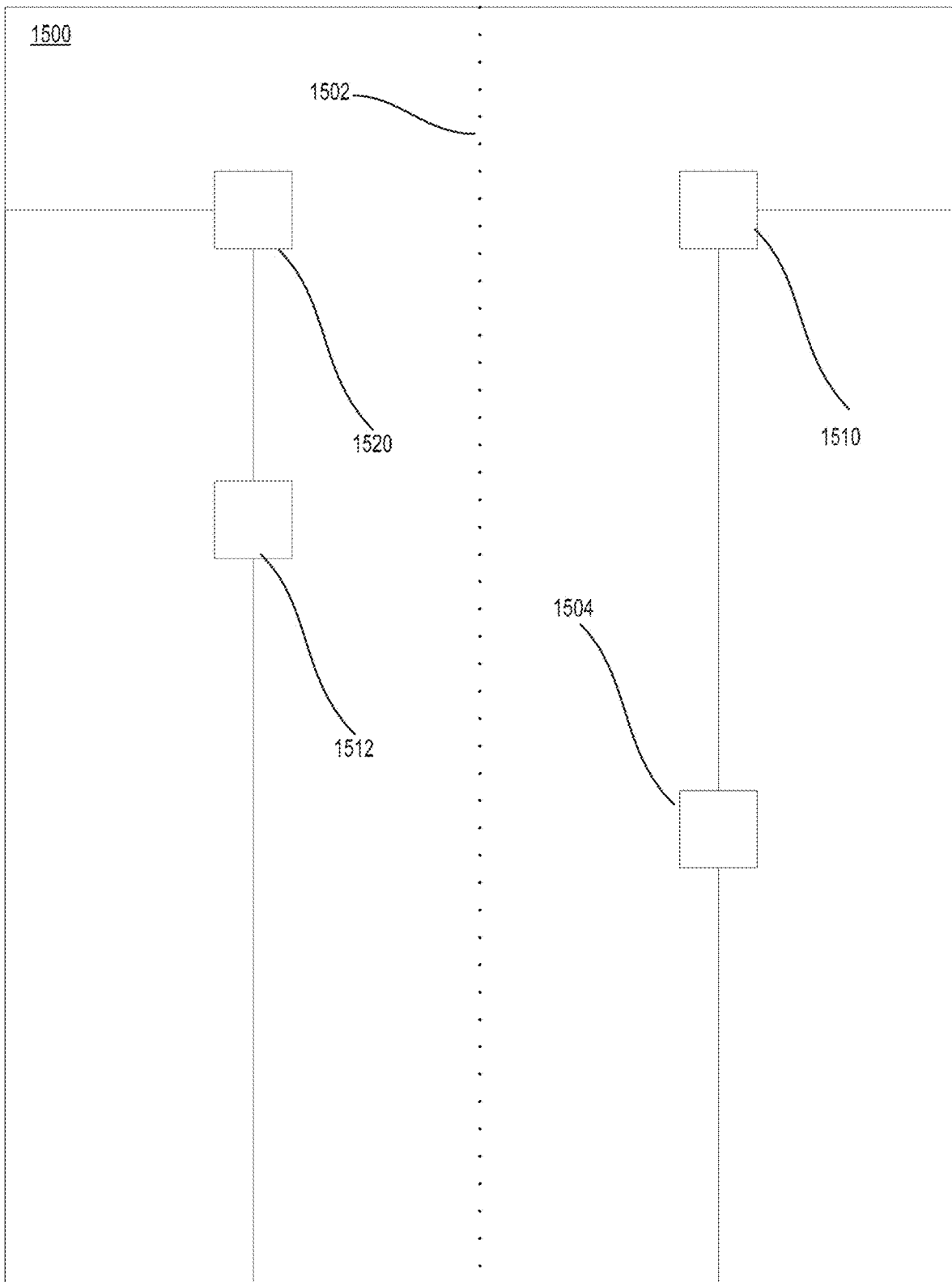

For instance, FIG. 15B shows a specific aisle of map 1500 depicted in FIG. 15A. FIG. 15B may represent a particular region of the environment. However, in other examples, FIG. 15B may also represent an entire environment of a robotic vehicle. In such embodiments, a robotic vehicle may receive sensor data at each position along path 1502. The detection frequencies of landmarks 1504, 1510, 1512, and 1520 may calculated based on a ratio of the number of times each landmark is detected to the total number of positions at which sensor data was received. Landmarks in less traversed portions of the map may thus have lower detection frequencies. Accordingly, such landmarks may be associated with worse localization viability metrics.

Other ways of determining regions of the environment are possible as well. Further, though regions 1514, 1516, and 1518 are depicted in FIG. 15A, in practice, such regions might not be provided for display on map 1500, as depicted in FIG. 15B.

Though not illustrated in FIG. 15A or FIG. 15B, it should be understood that map 1500 may include indications of the detection frequency associated with each landmark. A higher detection frequency may correspond to a higher localization viability metric. That is, a higher detection frequency may indicate that the associated landmark is positioned such that it contributes to accurate localization of the robotic vehicle. For example, a first indication of a localization viability metric may be associated with landmarks that are detected less than 50% of the time, such as landmark 1508. A second indication of the localization viability metric may be associated with landmarks that are detected between 50% and 70% of the time, such as landmark 1504. A third indication of the localization viability metric may be associated with landmarks that are detected 70% or more of the time, such as landmark 1506. Such frequencies used to determine the indication may depend on how the regions are determined. For example, where the entire mapped environment is used as the region, such indications may be determined based on lower ranges of frequencies.

Such indications of the localization viability metric may be color coded to denote such viability or lack thereof. For example, in FIG. 15A, the indication on map 1500 associated with landmark 1508 may be red, the indication associated with landmark 1504 may be yellow, and the indication associated with landmark 1506 may be green. Other ranges of detection frequencies may be used to determine viability levels as well.

A landmark being marked red may indicate that it is poorly placed such as is the case with landmark 1508. Landmark 1508 is not placed close to path 1502, and is blocked from view of path 1502. A landmark being marked yellow may indicate that it is adequately placed, but that it could be repositioned such that it is detected more frequently, and, as such, is of more use in localizing a robotic vehicle. A landmark being marked green may indicate that it is effectively placed to consistently assist in localizing a robotic vehicle.

Figure 16:
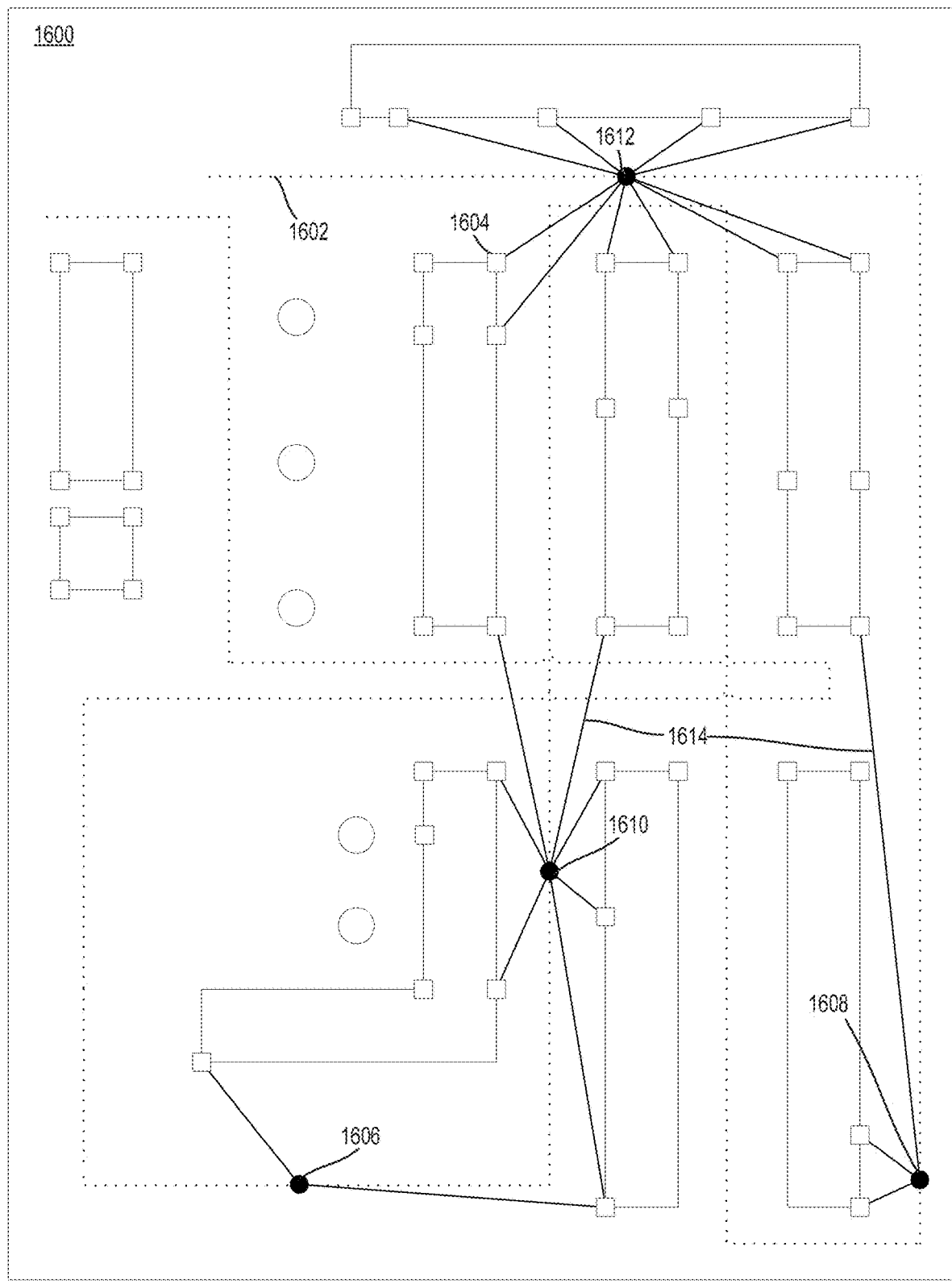
FIG. 16 illustrates another map of an environment of a robotic vehicle, in accordance with an example embodiment.

FIG. 16 illustrates another map of an environment of a robotic vehicle, in accordance with an example embodiment. The present example illustrates another basis for determining a localization viability metric associated with landmarks within the environment. Map 1600 includes indications of a path 1602 of a robotic vehicle, and landmarks 1604. The path includes positions 1606, 1608, and 1610, and 1612, at which the robotic vehicle detected landmarks placed in the environment.

According to the present example, at position 1606 the robotic vehicle detected two landmarks, at position 1608 the robotic vehicle detected three landmarks, at position 1610 the robotic vehicle detected seven landmarks, and at position 1612 the robotic vehicle detected ten landmarks. Such detected landmarks may be referred to as "subsets" of the landmarks placed within the environment. At a given position within the environment, a robotic vehicle may require a certain number of detections to accurately estimate its pose within the environment. For example, the robotic vehicle may require three such detections. As such, at position 1606, the robotic vehicle may be uncertain of its position within the environment. A landmark contained within several such deficient subsets may not provide viable localization of the robotic vehicle.

As such, the localization viability metric associated with a given landmark may be further based on the number of landmarks contained within each subset that includes the given landmark. For example, the viability metric may be based on the pose estimation confidence described above with regard to FIG. 11 determined at each position at which the given landmark is detections. In other examples, the viability metric may simply be based on a percentage of the subsets including the given landmark that meet or exceed a detected landmark threshold. In some examples, the detected landmark threshold for a subset may be three detected landmarks. In other examples, the viability metric may be based on a plurality of detected landmark thresholds.

Map 1600 may additionally include an indication of the number of detections at each position on path 1602. For example, at positions associated with a subset containing two or less landmarks, a first indication may be provided. At positions associated with a subset containing three or four landmarks, a second indication may be provided. At positions associated with a subset containing five to eight landmarks, a third indication may be provided. At positions associated with a subset containing eight or more landmarks, a fourth indication of the localization viability metric may be provided.

Though the localization viability metric may be determined based on subsets of landmarks detected at various positions of the environment, and though map 1600 may provide indications of numbers of landmarks detected at each position on path 1602, such functions may be performed independently. For example, though indications of pose estimation confidences may be provided on path 1602 without using such pose estimation confidences to determine localization viability metrics associated with the landmarks.

In other examples, map 1600 may alternatively include an indication of a confidence level associated with pose estimated at a given position on the map. The confidence level at the given position may be determined as described above with regard to FIG. 11.

Such indications of the localization viability metric may be color coded to denote such viability or lack thereof. In the present example, the indication on map 1600 associated with position 1606 may be red, the indication associated with position 1608 may be yellow, the indication associated with position 1610 may be green, and the indication associated with position 1612 may be blue. Other ranges of detected landmarks contained within a subset may be used to determine viability levels as well.

A position being marked red may indicate that a robotic vehicle will not be able to localized at that position, such as is the case with position 1606, which is associated with a subset containing only two landmarks. A position being marked yellow may indicate that a robotic vehicle will not be localized confidently, as it is more likely that a false detection at that position in the environment may taint the localization in such scenarios, such as in the example described above with regard to FIG. 10. A position being marked green may indicate that a robotic vehicle will be localized confidently at that position. A position being marked blue may indicate that more landmarks than necessary are detected at that position. In such scenarios, a nearby landmark may be removed and used elsewhere in the environment.

Though FIG. 16 simply depicts numbers of detections at each of positions, 1606, 1608, 1610, and 1612, it should be understood that such detections may occur at many points along path 1602. Further, though the localization viability metric, in some examples, may only rely on numbers of detection contained within subsets associated with each position at which a robotic vehicle obtains data, the metric may also be based on confidence levels, such as those described above with regards to FIGS. 7 and 11, determined when localizing the robotic vehicle at each position.

Further, though FIG. 16 includes one path of one robotic vehicle, it should be understood that map 1600 may include indications of cumulative data derived from two or more robotic vehicles navigating through the environment.

Further, though map 1600 includes indications of each detection 1614, it should be understood that, in practice, such indications may or may not be provided for display on the map. In some scenarios, as a robotic vehicle travels through the environment, such detection indications 1614 may be displayed each time the robotic vehicle makes the detections.

Figure 17:
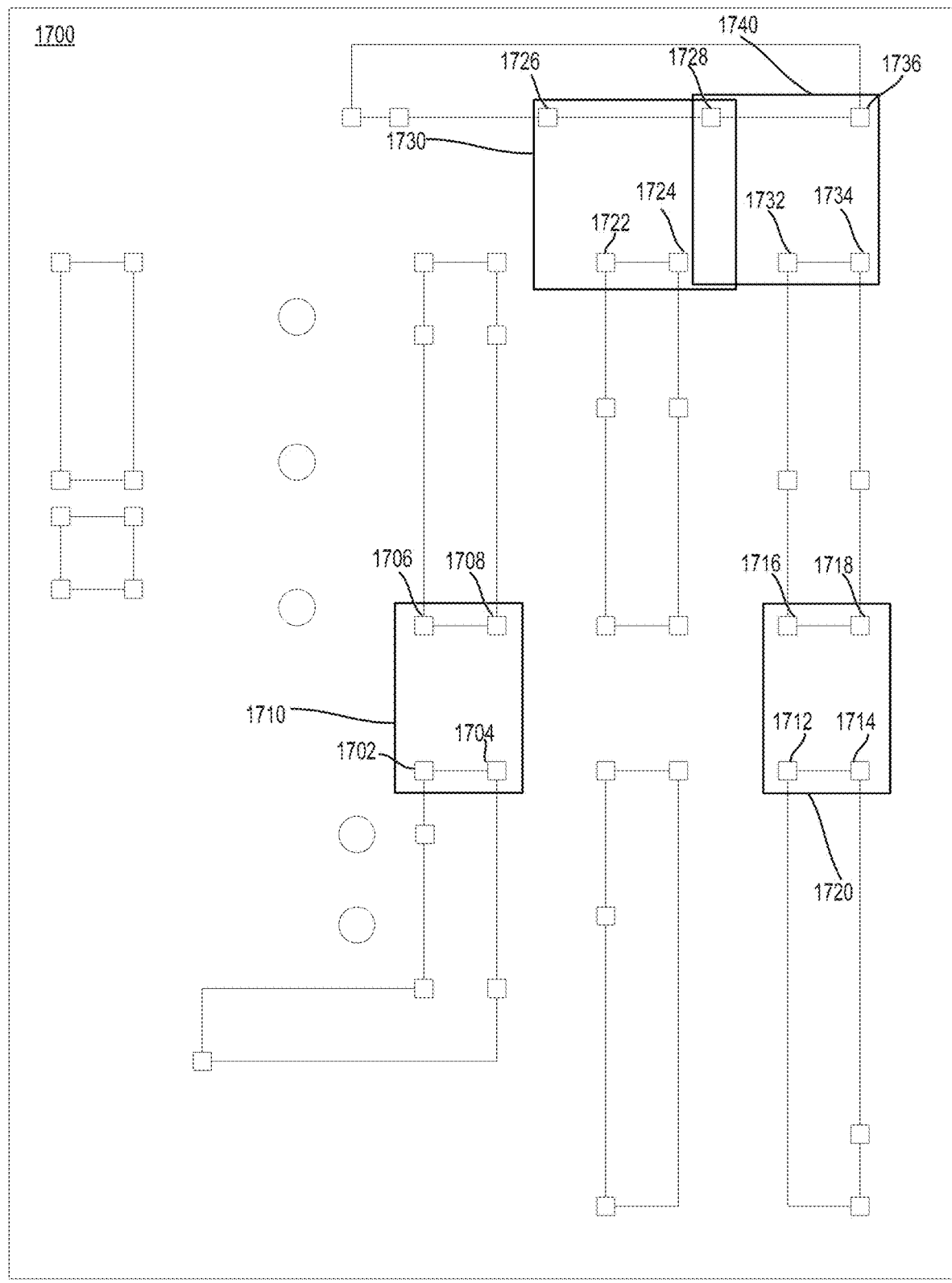
FIG. 17 illustrates another map of an environment of a robotic vehicle, in accordance with an example embodiment.

FIG. 17 illustrates another map of an environment of a robotic vehicle, in accordance with an example embodiment. The present example illustrates another basis for determining a localization viability metric associated with landmarks within the environment. In the present example, map 1700 includes a plurality of landmarks that form geometries 1710, 1720, 1730, and 1740. Geometry includes landmarks 1702, 1704, 1706, and 1708, geometry 1720 includes landmarks 1712, 1714, 1716, and 1718, geometry 1730 contains landmarks 1722, 1724, 1726, and 1728, and geometry 1740 contains landmarks 1728, 1732, 1734, and 1736. Where such geometries are similar, it may be difficult to confidently localize the robotic vehicle, because the detected landmarks may correspond to two or more geometries at different positions within the environment.

Accordingly, a localization viability metric associated with a given landmark may further be based on whether the given landmark is contained within a geometry that is similar to one or more different geometries. In the present example, geometry 1710 is similar to geometry 1720 and geometry 1730 is similar to geometry 1740. A viability metric associated with a landmark being part of such a geometry may be lower than one associated with a landmark that is not so associated.

Map 1700 may also provide an indication of such similar geometries. In the present example, rectangles are used to denote which landmarks are part of geometries that are similar to others, though other ways of indicating such geometries are possible as well. Further, though rectangular or trapezoidal geometries are depicted in FIG. 17, it should be understood that other geometries are possible as well.

Figure 18:
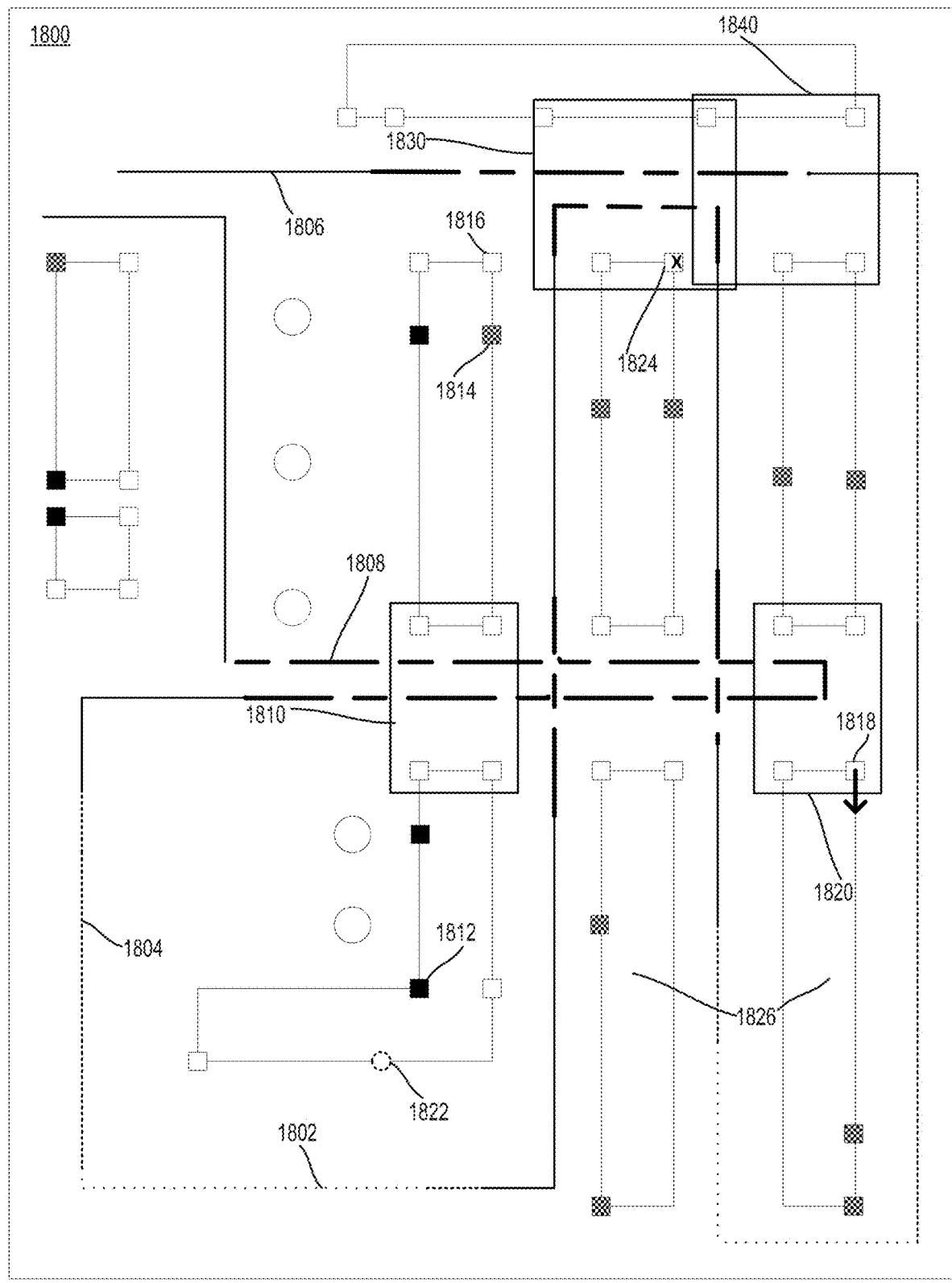
FIG. 18 illustrates another map of an environment of a robotic vehicle, in accordance with an example embodiment.

FIG. 18 illustrates another map of an environment of a robotic vehicle, in accordance with an example embodiment. In the present example, map 1800 depicts each indication of the localization viability metric associated with each landmark described above. For instance, certain landmarks, such as landmark 1812 have been colored black to denote a first localization viability metric level based on low detection frequencies associated with such landmarks. Certain other landmarks, such as landmark 1814, have been colored with a checkered pattern to denote a second localization viability metric level based on average detection frequencies associated with such landmarks. Certain other landmarks, such as landmark 1816 have been colored white to denote a third viability metric level based on high detection frequencies associated with such landmarks. It should be understood that, as described above with regard to FIG. 16, such indications may be denoted using colors.

In the present example, indications of pose estimation confidences are also provided on the robot path. Positions associated with portions of the path, such as portion 1802, have been marked with sparse dots to denote a lack of landmarks detected at such positions. Other positions associated with portions of the path, such as portion 1804, have been marked with dense dots to denote an acceptable number landmarks detected at such positions. Additional positions associated with portions of the path, such as portion 1806, have been marked with solid lines to denote an ideal number landmarks detected at such positions. Still other positions associated with portions of the path, such as portion 1808, have been marked with dashed lines to denote a surplus of landmarks detected at such positions. It should be understood that, as described above with regard to FIG. 17, such indications may be denoted using colors.

In some examples, the provided map may include indications of suggestions that may improve the localization viability metric associated with certain landmarks placed within the environment. For example, suggested landmark addition 1822 is provided near to path portion 1802, which indicated a lack of landmarks. Adding landmark 1822 may allow for adequate localization at positions within path portion 1802. As another example, landmark 824 is marked with an "X" to denote suggested removal of the landmark. Landmark 1824 is near to a path portion that includes positions at which a surplus of landmarks have been detected, and is within geometry 1830. Removing landmark 1824 may improve the localization viability metric associated with neighboring landmarks by simultaneously removing a surplus landmark for detection by the robotic vehicle, and changing geometry 1830 such that it is no longer similar to geometry 1840. As an additional example, landmark 1818 is marked with an arrow to denote a suggested change in position of the landmark. Changing the position of landmark 1818 in this way may improve the localization viability metric associated with neighboring landmarks by simultaneously removing a surplus landmark for detection by the robotic vehicle, and changing geometry 1810 such that it is no longer similar to geometry 1820. Other types of indications of suggestions to improve localization viability metrics are possible as well.

Map 1800 may also include indications of obstacles 1826 within the environment. Such suggested new landmarks, or landmark relocations, may be located on surfaces of such obstacles.

Figure 19:
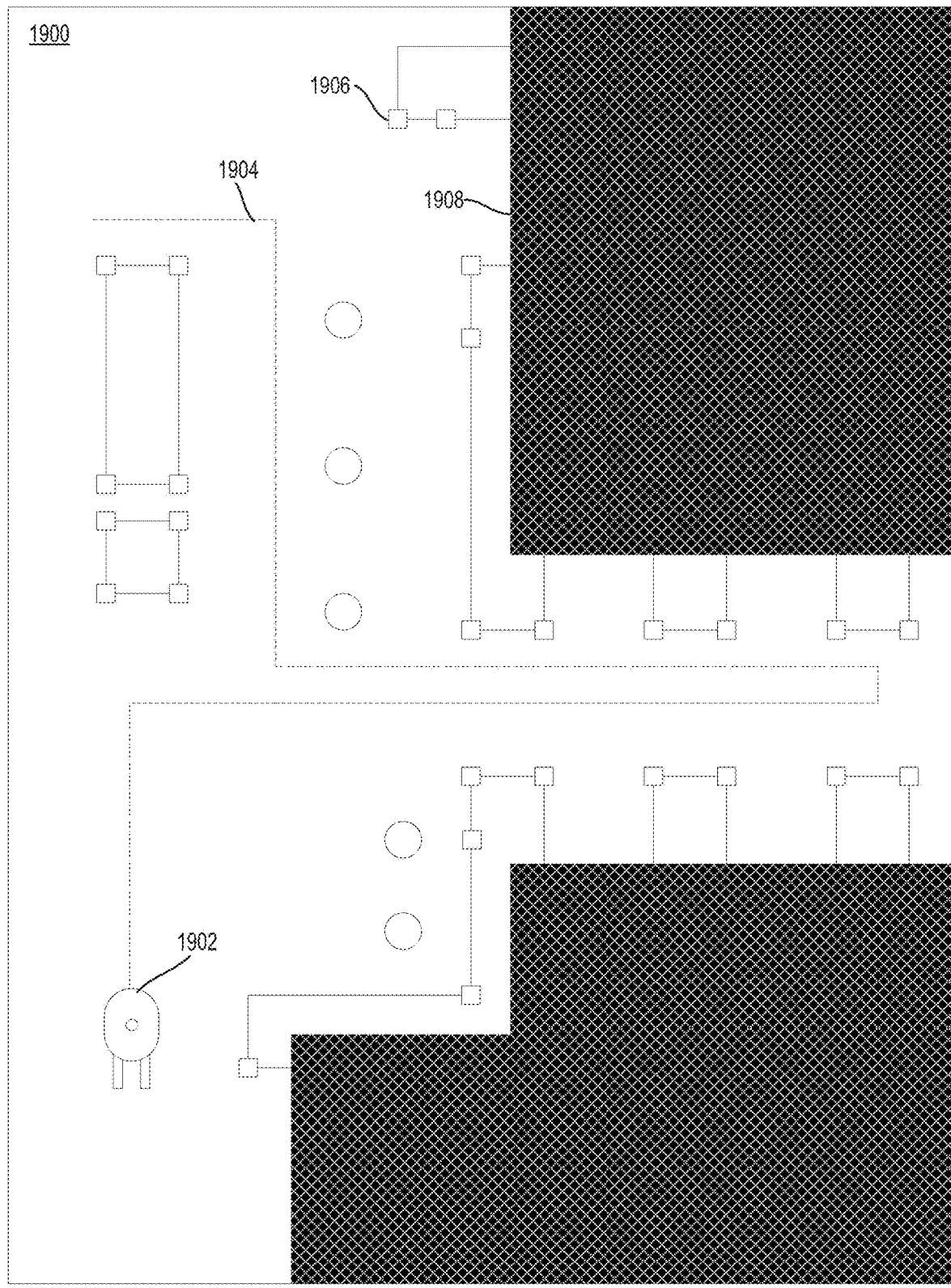
FIG. 19 illustrates another map of an environment of a robotic vehicle, in accordance with an example embodiment.

FIG. 19 illustrates another map of an environment of a robotic vehicle, in accordance with an example embodiment. As a robotic vehicle travels through the environment, map 1900 may provide indications of parts of the map that have been traversed, and parts that have not. For instance, in the present example, path 1904 is depicted, as well as a current location of robotic vehicle 1902. Landmarks 1906 detected as robotic vehicle 1902 travels through the environment are also depicted. However, regions 1908 are also provided that denote portions of the map not yet traversed by robotic vehicle 1902.

Though not depicted in the present example, the indications described and/or illustrated in FIGS. 14-18 may be provided and updated as the robotic vehicle 1902 navigates through the environment. Accordingly, the systems and methods described herein may be used to simultaneously map an environment, evaluate how effective landmarks are used for purposes of localization, and provide suggested changes to improve localization of vehicles and/or sensors within the environment. For example, as the robotic vehicle traverses the environment, indications of localization viability metrics provided at the robotic vehicle may show that a landmark is not being frequently detected and should be moved, or that not enough landmarks are placed in a portion of the environment. As such, the landmark locations may be adjusted, removed, or added to improve localization viability as the environment is mapped. Such changes to the environment may also be reflected in the map.

As noted above, in some scenarios, additional robotic vehicles may provide additional sensor data obtained at another plurality of positions within the environment. The additional sensor data may be used to update the localization viability metrics associated with landmarks placed in the environment. Such updated viability metrics may correspond to updated indications provided for display on the map.

Figure 20:
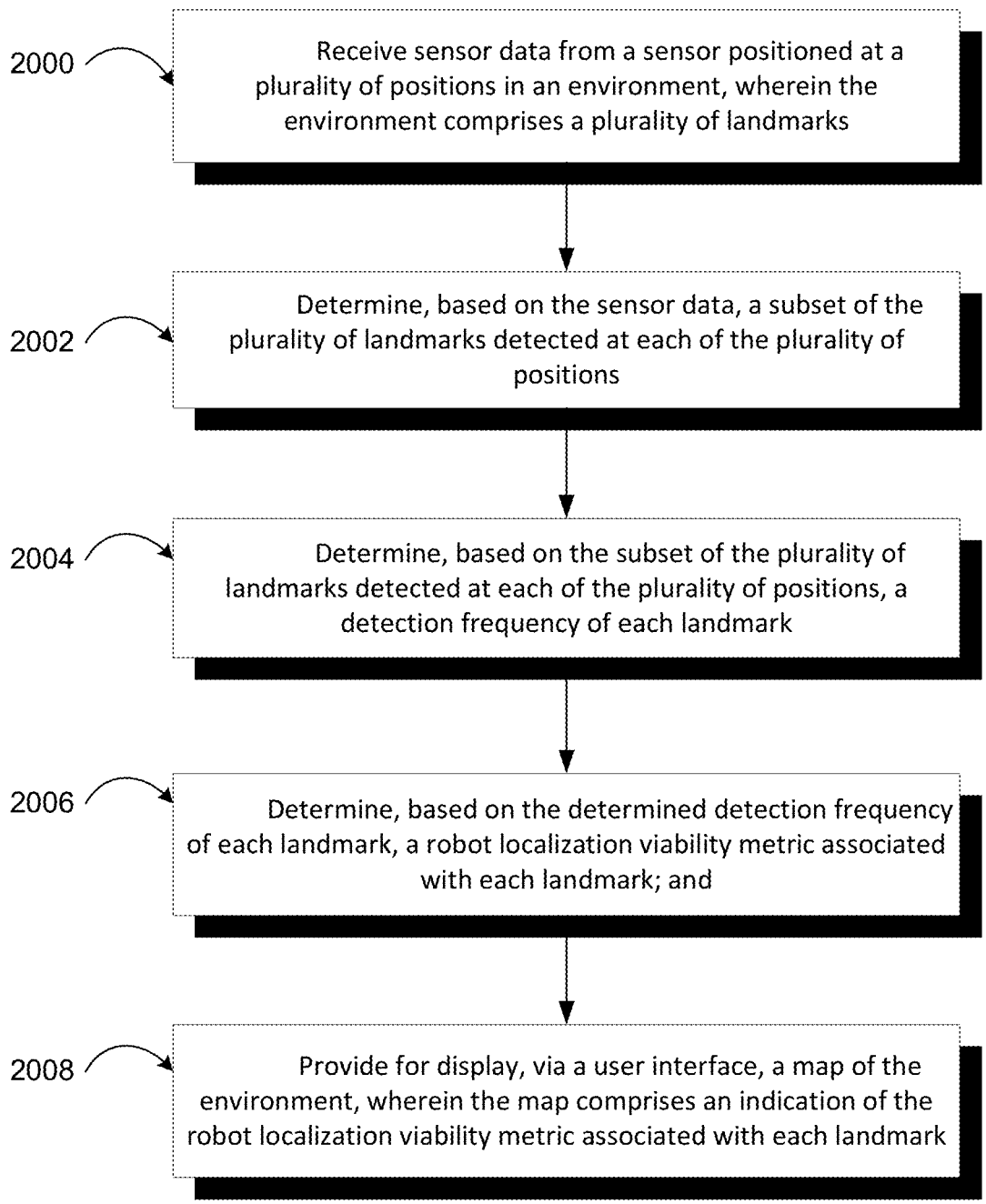
FIG. 20 is a block diagram of a method, in accordance with an example embodiment.

FIG. 20 is a block diagram of a method, in accordance with an example embodiment. In some examples, the method may be carried out as part of a system. For example, block 2002 may be carried out by one or more sensors of a robot in conjunction with one or more processors executing program instructions stored on a non-transitory computer readable medium. In the example, the one or more sensors of the robot may receive signals from a subset of landmarks placed within the environment, while the executed program instructions may detect the subset of the landmarks. The one or more processors may execute the program instructions to also perform the functions included in blocks 2000, 2004, 2006, and 2008.

In other examples, the method may be carried out as part of a computing system. In these examples, a non-transitory computer readable medium may store instructions executable by one or more processors to cause the computing system to perform the blocks of the method.

In these examples, the one or more processors and non-transitory computer readable medium may perform the blocks remotely. In other examples, the one or more processors and non-transitory computer readable medium may carry out the method at the robotic vehicle. In still other examples, portions of the method may be carried out remotely, while other portions may be carried out at the robotic vehicle.

Block 2000 of the method may be performed to receive sensor data from a sensor positions at a plurality of positions in an environment. The sensor may be mounted on a manually-operated sensor unit, as described with regard to FIG. 12, or on a robotic vehicle. As the sensor is moves through the environment, it may periodically scan the environment. The environment may include a plurality of landmarks.

Block 2002 of the method may be performed to determine, based on the sensor data, a subset of the plurality of landmarks detected at each of the plurality of positions.

Block 2004 of the method may be performed to determine, based on the subset of the plurality of landmarks detected at each of the plurality of positions, a detected frequency of each landmark. In some scenarios, the detection frequency may be based on a ratio of the number of times a given landmark was detected to a total number of positions within the environment at which sensor data was collected. However, in other examples, the detection frequency may be based on a region associated with the given landmark, as described above with regard to FIG. 15A.

Block 2006 of the method may be performed to determine, based on the determined detection frequency of each landmark, a localization viability metric associated with each landmark. In some examples, the localization viability metric associated with a given landmark may simply be based on the detection frequency of that landmark. However, in other examples, the localization viability metric may be a composite score of several characteristics associated with the given landmark. For example, the viability metric may be based on a detection frequency associated with the given landmark, as described above with regard to FIG. 15A, numbers of landmarks contained within subsets of landmarks that include the given landmark, as described above with regard to FIG. 16, and a geometry of landmarks associated with the given landmark, as described above with regard to FIG. 17.

Block 2008 of the method may be performed to provide for display, via a user interface, a map of the environment. The map may include an indication of the localization viability metric associated with each landmark.

IV. Other Embodiments

Though the detailed description of FIGS. 6-20 generally relates to sensor data associated with sensors on robotic vehicles positioned within an environment, it should be understood that such description is provided for purposes of example, and should not be construed as limiting. For instance, the same systems and methods described above may be implemented using sensors mounted on manually-operated vehicles. The systems and methods described above may also be implemented to using other devices, such as the manually-operated sensor unit described above with regard to FIG. 12. As such, in examples where a sensor is mounted on a vehicle, the sensor may be localized in the fashion described above with regard to FIGS. 10-11, and the vehicle may be localized by association.

Further, though generating a map as described above may be performed by a sensor or by a vehicle, it should be understood that such operations may be performed remotely by one or more processors, such as by the warehouse management system described above with regard to FIG. 2. For instance, one or more remote processors may receive sensor data from a plurality of sensors within the environment, and may update the map accordingly.

V. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    moving a sensor to a plurality of positions within an environment, wherein the environment comprises a plurality of landmarks;
    obtaining sensor data using the sensor at each of the plurality of positions;
    detecting one or more landmarks based on the sensor data obtained at each of the plurality of positions;
    defining a respective region surrounding each respective landmark, wherein two or more different landmarks of the plurality of landmarks have different defined regions;
    determining a detection frequency for each landmark, wherein the detection frequency corresponds to a number of positions at which sensor data was obtained within the region defined for a respective landmark, and to a number of times that the respective landmark was detected at the positions at which sensor data was obtained within the region;
    determining, based on the determined detection frequency of each landmark, a localization viability metric associated with each landmark; and
    providing for display, via a user interface, a map of the environment, wherein the map comprises an indication of the localization viability metric associated with each landmark.

2. The method of claim 1, wherein the sensor is mounted on a manually-operated sensor device.

3. The method of claim 1, wherein the sensor is mounted on a robotic vehicle.

4. The method of claim 3, further comprising:
    receiving additional sensor data from a second sensor positioned at a plurality of positions in the environment; and
    determining, based on the additional sensor data, an updated localization viability metric associated with each landmark, wherein the map comprises an indication of the updated localization viability metric associated with each landmark.

5. The method of claim 1, further comprising:
    determining, for a given landmark, a number of landmarks detected at each position at which the given landmark was detected; and
    determining the localization viability metric associated with the given landmark based on the number of landmarks detected at each position at which the given landmark was detected.

6. The method of claim 5, further comprising:
    determining, for the given landmark, a number of landmarks detected at a particular position of the plurality of positions;
    determining whether the number of landmarks detected at the particular position meets or exceeds a detected landmark threshold; and
    determining the localization viability metric associated with the given landmark based on the determination of whether the number of landmarks detected at the particular position meets or exceeds the detected landmark threshold.

7. The method of claim 1, further comprising:
    determining, for a given landmark, that the landmark is part of a geometric arrangement of landmarks that is similar to another arrangement of landmarks within the environment; and
    determining the localization viability metric associated with the given landmark based on the determination that the landmark is part of a geometric arrangement of landmarks that is similar to another arrangement of landmarks within the environment.

8. The method of claim 1, wherein the indication of the localization viability metric associated with a given landmark is selected from a plurality of viability levels, wherein each viability level is associated with a different color for display on the map.

9. The method of claim 8, wherein selecting a viability level of the plurality for the given landmark comprises:
    determining within which of a plurality of ranges of detection frequencies the detection frequency associated with the given landmark falls, wherein;
    a first viability level of the plurality is associated with a first range of detection frequencies rates, and a second viability level of the plurality is associated with a second range of detection frequencies; and
    the first viability level corresponds to a first color for display on the map of the environment and the second viability level corresponds to a second color for display on the map of the environment.

10. The method of claim 1, wherein the indication of the localization viability metric associated with a given landmark comprises a colored portion of the map corresponding to a position of the landmark within the environment, wherein the colored portion of the map corresponding to the position of the landmark within the environment provides a visual indication of a viability level of the localization viability metric.

11. The method of claim 1, wherein the provided map of the environment comprises an indication of a portion of the environment from which the sensor has obtained the sensor data and an indication of a portion of the environment from which the sensor has yet to obtain sensor data, wherein the portion of the environment from which the sensor has obtained the sensor data corresponds to the plurality of positions within the environment at which the sensor data was obtained.

12. The method of claim 1, wherein providing the map of the environment comprises providing updates to the map based on the received sensor data.

13. A system comprising:
    a sensor;
    one or more processors;
    a non-transitory computer-readable medium; and
    program instructions stored on the non-transitory computer readable medium and executable by the one or more processors to:

move a sensor to a plurality of positions within an environment, wherein the environment comprises a plurality of landmarks;

obtain sensor data using the sensor at each of the plurality of positions;

detect one or more landmarks based on the sensor data obtained at each of the plurality of positions;

define a respective region surrounding each respective landmark, wherein two or more different landmarks of the plurality of landmarks have different defined regions;

determine a detection frequency for each landmark, wherein the detection frequency corresponds to a number of positions at which sensor data was obtained within the region defined for a respective landmark, and to a number of times that the respective landmark was detected at the positions at which sensor data was obtained within the region;

determine, based on the determined detection frequency of each landmark, a localization viability metric associated with each landmark; and provide for display, via a user interface, a map of the environment, wherein the map comprises an indication of the localization viability metric associated with each landmark.

14. A non-transitory computer readable medium having stored therein instructions executable by one or more processors to cause a computing system to perform functions comprising:

moving a sensor to a plurality of positions within an environment, wherein the environment comprises a plurality of landmarks;

obtaining sensor data using the sensor at each of the plurality of positions;

detecting one or more landmarks based on the sensor data obtained at each of the plurality of positions;

defining a respective region surrounding each respective landmark, wherein two or more different landmarks of the plurality of landmarks have different defined regions;

determining a detection frequency for each landmark, wherein the detection frequency corresponds to a number of positions at which sensor data was obtained within the region defined for a respective landmark, and to a number of times that the respective landmark was detected at the positions at which sensor data was obtained within the region;

determining, based on the determined detection frequency of each landmark, a localization viability metric associated with each landmark; and providing for display, via a user interface, a map of the environment, wherein the map comprises an indication of the localization viability metric associated with each landmark.

15. The method of claim 1, wherein defining the respective region surrounding each respective landmark comprises defining, for each respective landmark, a region that excludes portions of the environment that visually block a line of sight to the respective landmark.

16. The method of claim 1, wherein defining the respective region surrounding each respective landmark comprises defining an area for the respective region that is within a radius of each respective landmark.

* * * * *